US007633963B1

(12) United States Patent
Anderson et al.

(10) Patent No.: US 7,633,963 B1
(45) Date of Patent: Dec. 15, 2009

(54) ACCESSORY INTERFACE BUS FOR TELEPHONE HEADSET ADAPTER

(75) Inventors: Arthur Anderson, Aptos, CA (US); David Huddart, Westbury-on-Trym (GB); Keith Derrick, Swindon (GB)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 09/401,070

(22) Filed: Sep. 22, 1999

(51) Int. Cl.
H04L 12/66 (2006.01)
(52) U.S. Cl. .................................................... 370/463
(58) Field of Classification Search ............... 370/246, 370/253, 340, 342, 360, 282, 359, 419–421, 370/463; 379/110.01, 93.05, 93.37, 430, 379/441, 442, 443, 444, 445, 446, 447, 448, 379/449, 450, 451, 452, 453, 454, 455, 456, 379/214.01, 265, 267, 365, 420, 438
See application file for complete search history.

(56) References Cited

U.S. PATENT DOCUMENTS

| | | | | |
|---|---|---|---|---|
| 3,793,488 | A * | 2/1974 | King ......................... 370/431 |
| 4,654,655 | A * | 3/1987 | Kowalski .................... 710/114 |
| 4,706,082 | A * | 11/1987 | Miesterfeld et al. ...... 340/825.5 |
| 4,893,331 | A * | 1/1990 | Horiuchi et al. ............. 379/441 |
| 4,918,598 | A * | 4/1990 | Ashkin et al. ................. 710/3 |
| 4,943,963 | A * | 7/1990 | Waechter et al. ............ 370/428 |
| 4,998,264 | A * | 3/1991 | Woodward .................. 375/373 |
| 5,003,536 | A * | 3/1991 | Tanaka et al. ................ 370/218 |
| 5,099,514 | A * | 3/1992 | Acree ......................... 379/441 |
| 5,140,611 | A * | 8/1992 | Jones et al. .................. 375/219 |
| 5,226,077 | A * | 7/1993 | Lynn et al. .................... 379/395 |
| 5,278,848 | A * | 1/1994 | Yamaguchi ................. 714/800 |
| 5,339,360 | A * | 8/1994 | Endick et al. ................ 379/386 |
| 5,349,640 | A * | 9/1994 | Dunn et al. .................. 370/271 |
| 5,414,751 | A * | 5/1995 | Yamada ....................... 455/418 |
| 5,430,432 | A * | 7/1995 | Camhi et al. ................. 340/438 |
| 5,488,657 | A * | 1/1996 | Lynn et al. .................... 379/395 |
| 5,488,693 | A * | 1/1996 | Houck et al. ................. 370/443 |
| 5,530,896 | A * | 6/1996 | Gilbert ........................... 710/9 |
| 5,631,955 | A * | 5/1997 | Adams et al. ................ 379/165 |
| 5,642,101 | A * | 6/1997 | Stirk et al. .................... 340/438 |
| 5,825,873 | A * | 10/1998 | Duncan et al. ........... 273/157 R |
| 5,838,687 | A * | 11/1998 | Ramfelt ....................... 370/443 |
| 5,848,143 | A * | 12/1998 | Andrews et al. ........... 340/3.51 |

(Continued)

FOREIGN PATENT DOCUMENTS

EP 412902 A2 * 2/1991

*Primary Examiner*—Thai D Hoang
(74) *Attorney, Agent, or Firm*—Intellectual Property Law Office of Thomas Chuang

(57) ABSTRACT

An accessory interface bus for a telecommunications headset adapter or base unit, which controls and monitors the operations of various headset accessories coupled to the interface bus, is disclosed. The accessory interface bus allows the telecommunications headset adapter to detect when a new accessory is coupled to the bus. The interface bus may be implemented within a headset adapter base in a telecommunications system that includes the headset adapter base, a telecommunications headset coupled to the adapter base, and various headset accessories coupled to the adapter base. The interface bus transmits control and status signals between the headset adapter base and the various headset accessories to directly control and monitor operations for each headset accessory coupled to the interface bus. The control and monitoring of a given headset accessory may include activating or deactivating, resetting, and/or simulating a button press of a button located on the accessory.

78 Claims, 5 Drawing Sheets

U.S. PATENT DOCUMENTS

| | | | |
|---|---|---|---|
| 5,926,543 A * | 7/1999 | Lynn et al. | 379/395 |
| 5,937,031 A * | 8/1999 | Stelman | 379/1.01 |
| 5,940,387 A * | 8/1999 | Humpleman | 710/3 |
| 5,991,637 A * | 11/1999 | Mack et al. | 455/563 |
| 6,034,623 A * | 3/2000 | Wandel | 340/870.01 |
| 6,085,265 A * | 7/2000 | Kou | 710/9 |
| 6,108,614 A * | 8/2000 | Lincoln et al. | 702/183 |
| 6,198,777 B1 * | 3/2001 | Feher | 375/295 |
| 6,484,212 B1 * | 11/2002 | Markowitz et al. | 709/246 |
| 6,683,952 B1 * | 1/2004 | Bernardi et al. | 379/447 |
| 2009/0186639 A1 * | 7/2009 | Tsai | 455/466 |

* cited by examiner

ACCESSORY INTERFACE BUS FOR TELEPHONE HEADSET ADAPTER

FIELD OF THE INVENTION

The invention relates generally to the field of telecommunications headsets. More specifically, the invention relates to an accessory interface bus for a telephone headset adapter which can be used to control, monitor and test operations of accessories to the telephone headset which are coupled to the interface bus.

BACKGROUND OF THE INVENTION

Telecommunications headsets are well known in the art and can be used by a variety of persons in a diversity of applications, including telephone operators, radio operators, aircraft personnel and other situations in which "hands-free" access to telecommunications systems is desirable.

Most telecommunications headsets are connected to existing phone systems through the use of a headset adapter or base unit. A headset adapter or base unit allows the telecommunications headset to be connected to any one of a variety of different telephone systems at the telephone handset port. The adapter or base unit adjusts for proper wiring, necessary gain, and impedance matching for both transmitting voice signals to and receiving voice signals from the telecommunications headset.

Additionally, conventional headset adapters or base units may also be configured to provide power, as needed, to various accessories of the telecommunications headset. For example, most headsets require the handset receiver to be lifted for each call. A remote handset hookswitch control may be configured to automatically toggle between handset/headset operations. Alternately, an automatic handset lifting device, such as the Smith Corona SMC89842, may be used to automatically lift the handset at the touch of a button. These headset accessory devices may be coupled to a conventional headset adapter in order to provide power to the accessory whenever the headset adapter is activated.

As an additional example, users often wear headsets throughout the day and there may be no way for others to determine whether a user is actually engaged in a phone conversation. Accordingly, in-use or on-line indicators may be coupled to or provided with the headset adapter base in order to indicate when the user is actually engaged in a phone conversation. These on-line indicators typically include at least one light emitting diode which is activated whenever the headset adapter base is actively transmitting and receiving signals to and from the headset. Once again, this type of on-line indicator may be coupled to a conventional headset adapter in order to provide power to the on-line indicator whenever the headset adapter is activated.

However, conventional headset adapters do not currently provide true control over the operation of various headset accessories. Instead, conventional headset adapters are only capable of providing power to these accessories in order to turn these accessories on or off. Typically, this is done by providing a signaling line between the headset adapter and the accessory, with the signaling line providing a voltage swing between 0 and 5 volts.

This configuration is inadequate for several reasons. First, it does not allow for accessories requiring different on and off voltage level swings. The voltage swing is fixed in any given headset adapter base and future accessories may not be arbitrarily added to an existing system configuration unless these accessories specifically conform to the fixed voltage swing of the headset adapter. Moreover, this configuration is also inadequate because it does not allow for more than mere on/off control of an accessory. There is no way of monitoring the current status of an accessory, providing direct control over the operation of the accessory, or detecting errors in the operation of an accessory. Instead, each headset accessory must be separately controlled and monitored. Finally, each individual headset accessory must be disconnected from the system and individually tested in order to detect errors and ensure proper operation of the accessory.

Accordingly, what is needed is an efficient method and apparatus for providing direct, centralized control over various accessories to a telecommunications headset and headset adapter base. What is further needed is an efficient method and apparatus for easily adding additional accessories to a telecommunications system even if the additional accessories may each have differing power requirements. What is further needed is a method and apparatus which is also able to provide on-the-fly testing of various headset accessories in order to quickly and accurately determine if the accessory is working properly.

SUMMARY OF THE INVENTION

The present invention is directed to an accessory interface bus for a telecommunications headset adapter or base unit, which controls and monitors the operations of various headset accessories coupled to the interface bus. The accessory interface bus allows the telecommunications headset adapter to detect when a new accessory is coupled to the bus and further enables the headset adapter to control and monitor operations of the accessory.

In one aspect of the invention, the interface bus is implemented within a headset adapter base for use in a telecommunications system, wherein the system includes the headset adapter base, a telecommunications headset coupled to the adapter base, and various headset accessories which are also coupled to the adapter base. The interface bus transmits control and status signals between the headset adapter base and the various headset accessories in order to centralize the control and monitoring of operations for each of the headset accessories coupled to the interface bus.

In another aspect of the invention, the interface bus is implemented within a headset adapter base as part of a test system, wherein headset accessories may be coupled to the interface bus of the test system after manufacture, but before shipment, in order to test operations of the headset accessory in a simulated environment, as if it were actually connected to a headset adapter base in a fully operational telephone system. In this way, if the headset accessory is going to be coupled to a headset adapter base not having an interface bus, the operations of the accessory can be easily tested and verified before shipment, thereby dramatically reducing production costs.

In a further aspect of the invention, the interface bus is preferably implemented within a headset adapter base and includes a positive unregulated power line, a ground (low voltage rail) line, and at least one signal line. Preferably, the at least one signal line is a bidirectional signaling line with interface bus addressing capability, such that the headset adapter and each accessory coupled to the bus is assigned a unique bus address. The positive unregulated power line and low voltage rail allow accessories may have various voltage swing power requirements in order to be easily added to or removed from the bus.

In a further aspect of the invention, direct control and monitoring of accessories coupled to the interface bus is accomplished by passing communications packets over the interface bus, between the headset adapter and the accessories, using communications packets. The communications packets each include a command/data byte which may be utilized to control and monitor various headset accessories including, but not limited to, activating or deactivating various accessories, resetting any accessory, and simulating a button press of any button located on the accessory.

In yet another aspect of the invention, the communications packet includes an initial rate bit which defines the transmission rate for each packet. Thus, accessories coupled to the interface bus may each have different transmission rates and still be able to communicate over the interface bus. This makes it possible for as of yet unspecified accessories to be coupled to the interface bus and directly controlled and monitored by the headset adapter base regardless of different transmission rates.

In yet another aspect of the invention, the communications includes a plurality of bits which are defined as one or zero bits. Unlike standard conventional binary 1 and 0 bits, the one and zero bits of the present invention are defined by their individual waveforms. Moreover, both one and zero bits each have a rising and falling edge within a single bit period. Accordingly, because every one or zero bit has a rising and falling edge, both ends of any communication link can be synchronized on the transmission of every bit in order to eliminate inaccuracies in transmission.

In a final aspect of the invention, bus arbitration is accomplished through a combination of collision avoidance techniques and collision detection mechanisms. Collision avoidance techniques ensure that only one device coupled to the interface bus communicates over the bus at any one time. Collision detection mechanisms are used to detect when transmission errors have occurred which might have been caused by multiple devices attempting to transmit over the interface bus at the same time. The collision avoidance techniques include a random delay between transmissions and the collision detection techniques include acknowledge handshaking with an associated hold time.

BRIEF DESCRIPTION OF THE DRAWINGS

The present invention has advantages and features which will be more readily apparent from the following detailed description of the invention and the appended claims, when taken in conjunction with the accompanying drawings, in which:

DETAILED DESCRIPTION OF PREFERRED EMBODIMENT

An accessory interface bus for a telecommunications headset adapter enables the headset adapter to issue control signals to and monitor status signals from various headset accessories coupled to the interface bus.

System Architecture

Figure 1:
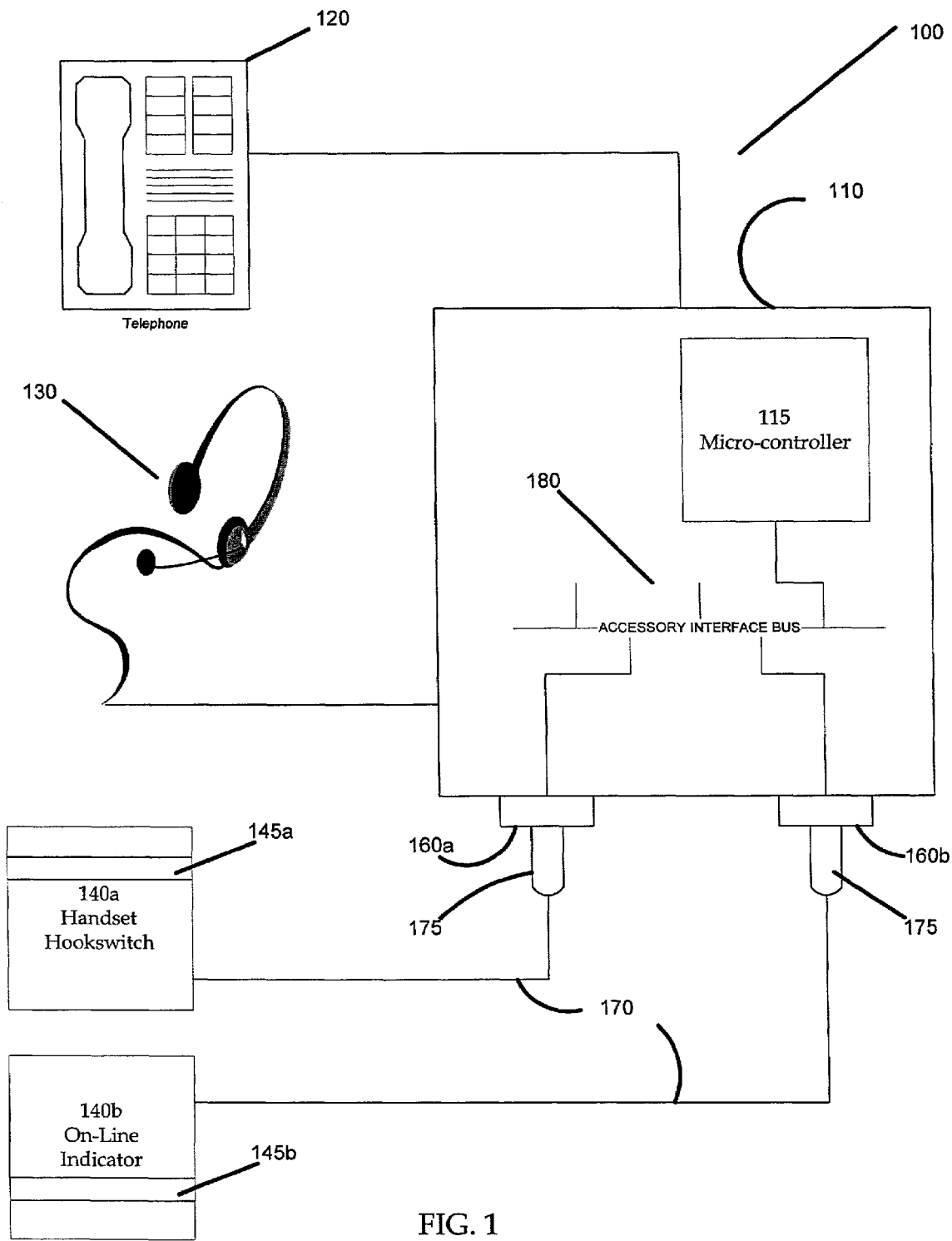
FIG. 1 illustrates a block diagram of a telecommunications system which includes the accessory interface bus of the present invention.

FIG. 1 illustrates a block diagram of a telecommunications system 100 which includes the accessory interface bus of the present invention. As shown in FIG. 1, the telecommunications system 100 includes a headset adapter base 110 coupled between a local telephone 120 and a telecommunications headset 130. The headset adapter base 110 transmits audio voice signals between the telecommunications headset 130 and the local telephone 120 by adjusting and amplifying frequency and audio level parameters of those signals. The process of coupling and communicating voice signals between the local telephone 120 and the telecommunications headset 130, via the headset adapter base 110, is well known in the art and no further discussion with regard to such coupling or communication is included within this application.

In accordance with the present invention, the headset adapter base includes a micro-controller 115 and the accessory interface bus 180. One or more headset accessories may be coupled to the accessory interface bus 180 through interface bus ports 160a and 160b located on the headset adapter base 110. For example, in the illustrated embodiment of FIG. 1, the headset adapter base 110 is further coupled to a remote handset hookswitch control 140a and an on-line indicator 140b. The remote handset hookswitch control 140a and the on-line indicator 140b are both headset accessories which are coupled directly to the accessory interface bus 180 through interface bus ports 160a and 160b located on the headset adapter base 110. Other potential accessories include a handset lifter, a call timer, and a laptop interface. These accessories are merely exemplary of the kinds of headset accessories which may be coupled to the interface bus 180 of the present invention, and it is understood that the interface bus 180 is not intended to be limited to communications with only these accessories. Instead, the interface bus 180 of the present invention is intended for use in controlling, monitoring and testing all types of headset accessories currently known or which may become available in the future which are configured for or easily adapted to coupling with the interface bus 180 and designed to communicate with the headset adapter in accordance with the techniques and principles set forth further herein.

Interface bus ports 160a and 160b are preferably identical female type jacks which conform to JIS Concentric Plugs and Jacks Specification, C6560:1994, although it is understood that alternate types of interconnects may be used for interface bus ports. The headset accessories 140a and 140b are each coupled to the accessory interface bus ports 160a and 160b by three wire cables 170 which preferably terminate into male type connector plugs 175, such as 3.5 mm male stereo plugs. Once again, it is understood that the invention is not intended to be limited to female interface port-male connector mating, and alternative configurations are envisioned such as male interface port-female connector mating, male interface port-male connector mating using a dual female adapter, or female interface port-female connector mating using a dual male adapter.

In order to minimize the size of the headset adapter 110 and lower manufacturing costs, the headset adapter 110 preferably has a limited number of interface bus ports 160a and 160b. Accordingly, each of the headset accessories preferably includes a conductive pass through port 145a and 145b which allows signals to pass directly through the headset accessory, from a first end of the conductive pass through port to a second end of the conductive pass through port. In this way, multiple headset accessories may be daisy chained together for coupling to the accessory interface bus 180 via a single interface bus port 160. Therefore, although the number of interface bus ports 160a and 160b on any given headset adapter base 110 may be limited, the number of headset accessories which may actually be coupled to the interface bus 180 is only limited by the number of addresses available on the accessory interface bus 180.

In a preferred embodiment, the accessory interface bus 180 provides a positive unregulated high voltage rail (Vdd) used as a power line for providing power to the accessories 140a and 140b coupled to the interface bus 180, a low voltage rail (Vss) used as a ground line, and at least one signaling line for transferring communications between the micro-controller 115 in the headset adapter 110 and each of the headset accessories 140 and 140b coupled to the interface bus 180. Preferably, the at least one signaling line is a single bi-directional signaling line; however, two or more signaling lines may be used, wherein each of these lines may be either unidirectional or bi-directional.

In one embodiment, the accessory interface bus 180 of the present invention is configured to provide a raw voltage level difference between the high and low voltage rails (Vdd−Vss), $V_{RAW}$, ranging between a preferred range of 8.0 Volts and 14.0 Volts, with the total current drawn by all accessories on the bus limited to that shown in the following table:

| $V_{RAW}$ DC Voltage Diff. | Max Average Current (Amps) | Max Instantaneous Current (Amps) |
|---|---|---|
| 8.0 Volts-14.0 Volts | 750 mA | 1.2 |

In the preferred embodiment, the at least one bi-directional signaling line of the accessory interface bus 180 is ordinarily held high by a weak pull up resistor in the adapter base 110. The line is pulled low by an accessory, or the adapter base, before the accessory, or the adapter base, transmits over the interface bus 180.

The accessory interface bus 180 is a multi-master type bus with unique addressing, wherein every accessory is connected to the bus in parallel and assigned a unique bus address. As will be discussed later herein, a preferred embodiment of the interface bus 180 allows for a communications packet protocol having eight bit addressing such that there are two hundred fifty-six available addresses on the interface bus 180, although some of these available addresses may be reserved for special transmission functions, as will be described later herein.

The micro-controller 115 is able to pass command and status monitoring messages to each individual headset accessory and receive data or status messages from each individual headset accessory via the interface bus 180. In this way, the headset adapter base 110 is able to control the operations of and individually monitor each headset accessory 140a and 140b. Additionally, the micro controller 115 may include standardized testing algorithms or specialized test routines in order to conduct on-the-fly testing of various headset accessories which may be coupled to the interface bus 180, in order to determine whether these accessories are operating properly without having to disconnect the accessory from the interface bus 180.

One particularly beneficial aspect of the testing and monitoring capabilities of the accessory interface bus of the present invention, is the ability to easily and accurately test accessories during the manufacturing process using only a single headset adapter base 110 with built-in micro-controller 115. The micro-controller 115 can be programmed to store standardized testing algorithms or specialized testing routines which can be used to test the headset accessory and simulate operation of the accessory, as if the accessory were actually incorporated into a fully functional telecommunications system. Additionally, the micro-controller may be programmed to store standardized testing algorithms or specialized testing routines designed to test the headset adapter base 110 and operations of the accessory interface bus 180.

Alternatively, a separate test box may be designed for testing the accessories. The test box may be coupled to the interface bus 180. The test box may be programmed to store standardized testing algorithms or specialized testing routines which can be used to test a headset accessory and simulate operation of the accessory, as if the accessory were actually incorporated into a fully functional telecommunications system. The test box may be configured to provide some or all of the functionality of a headset adapter base.

Communications Packet Protocol

Figure 2:
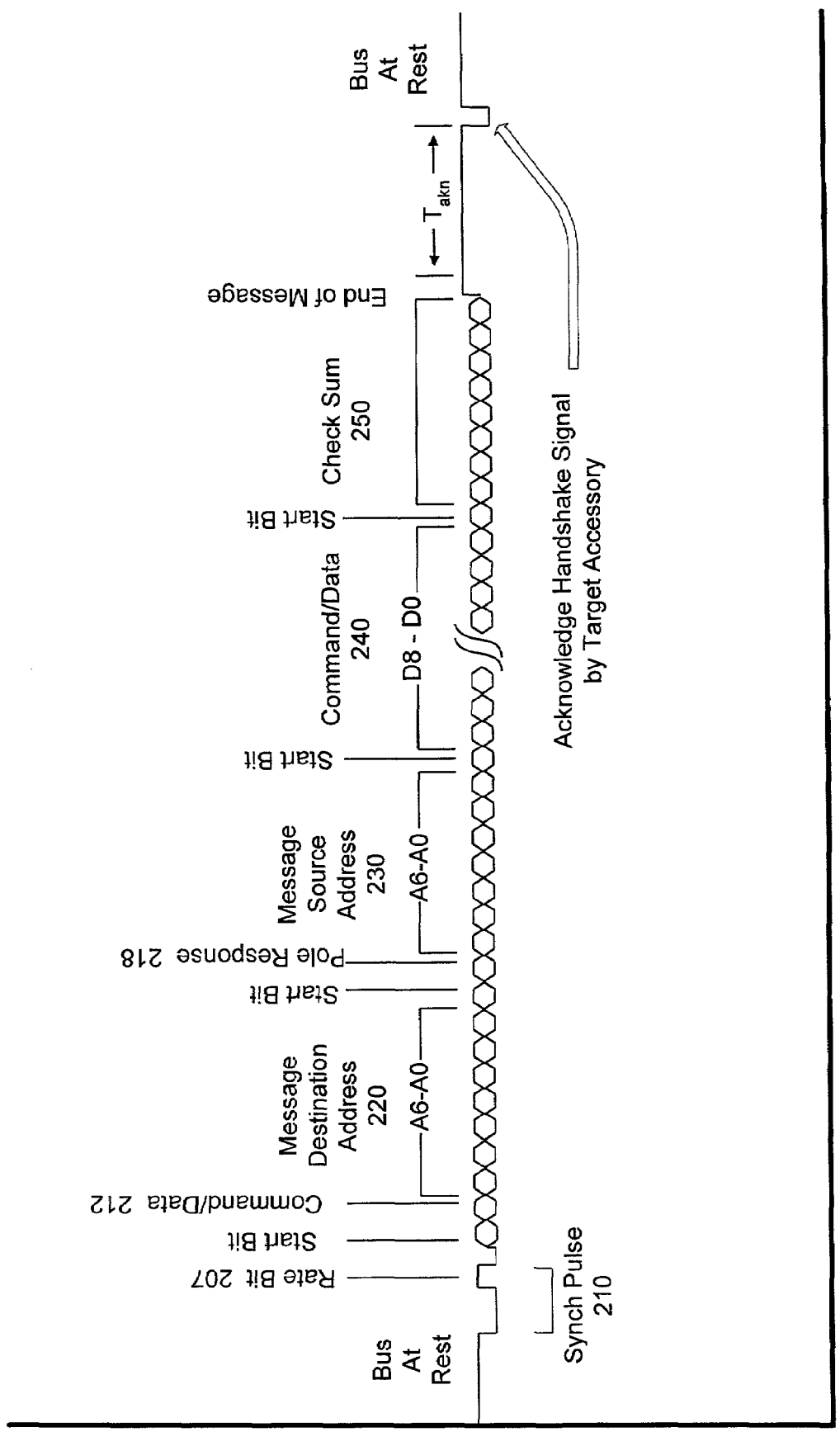
FIG. 2 illustrates a signal trace which implements the communications packet protocol utilized by the interface bus of the present invention and further shows a response acknowledge signal which is typically transmitted by an accessory after receipt of a command instruction.

The interface bus 180 of the present invention uses a communications packet protocol for transmitting command/data back and forth over the interface bus. FIG. 2 illustrates a signal trace which implements the communications packet protocol utilized by the interface bus of the present invention. FIG. 2 further shows a response acknowledge handshaking signal which is typically transmitted by an accessory after receipt of a command instruction, acknowledging proper receipt of the command.

As shown in FIG. 2, the interface bus is ordinarily left high through a pull-up resistor. A communications packet includes a Synch Pulse 210 for initiating a packet transmission, gaining bus control, and setting up a transmission rate for the packet transmission. As is further illustrated in FIG. 2, the Synch Pulse 210 is preferably three bits wide and the accessory interface bus is pulled low during the initial two bits of the Synch Pulse 210. The third bit of the Synch Pulse 210 is a rate bit 207. It is understood that the Synch Pulse 210 may be longer than or shorter than three bits wide so long as at least one of the bits in the Synch Pulse 210 is a rate bit 207 which is used to defined the transmission rate of the communications packet, as further defined hereinafter.

The communications packet protocol further includes a Destination Address 220, having a command/data bit 212 which indicates whether the communications packet includes a command or data in response to a command/status request. In the embodiment illustrated in FIG. 2, the command/data bit 212 is the most significant bit (MSB) of the Destination Address 220, although it is understood that the MSB position has been chosen for convenience sake and any other bit in the Destination Address 220 may, alternatively, be chosen to represent the command/data bit 212.

The communications packet also includes a Source Address 230, having a pole response bit 218 which indicates whether the communications packet is being transmitted in response to a polling of the interface bus. In the embodiment illustrated in FIG. 2, the most significant bit (MSB) of the Source Address 230 is the pole response bit 218. Alternatively, it is understood that the MSB position has been chosen for convenience sake and any other bit in the Source Address 230 may have been chosen to represent the pole response bit 212.

Finally, the communications packet further includes a Command/Data 240 portion which includes a command or data in response to a command/status request. The command may be directed to a particular accessory or it may be directed to multiple accessories. In a testing environment, in which the interface bus of the present invention is implemented in an adapter base as part of a test system, the contents of the Command/Data portion 240 may be compared with anticipated or expected results in order to ensure proper operations of a headset accessory.

Preferably, the communications packet also includes a Checksum byte 250 which is used to detect transmission errors. As will be described further herein, the Checksum byte 250 is an encoded combination of all the previous bytes in the communications packet. Additionally, as shown in FIG. 2, all bytes in the communications packet are preferably preceded by a start bit. The start bit is preferably a "zero" bit, as defined further herein. It is understood that each byte in the communications packet may, alternatively, be preceded by more than one start bit and a start bit may, alternatively, be a "one" bit as defined further hereinafter.

After each communications packet is transmitted, the interface bus is once again pulled high by the pull-up resistor. For some particular commands from the headset adapter base to the accessory, the headset adapter base requires the accessory to acknowledge that it has in fact properly received the command. In this case, the interface bus is left high for a set acknowledgment hold period, $T_{akn}$, during which only the accessory receiving the command may transmit an acknowledge handshaking signal to the headset adapter base. FIG. 2 illustrates the acknowledge hold period and further shows an acknowledge handshaking signal which is transmitted by an accessory over the interface bus. It should be noted that the acknowledge handshaking signal merely acknowledges proper receipt of the command. This aspect of the invention is described in further detail with regard to bus arbitration and collision avoidance techniques utilized by the interface bus of the present invention.

Figure 3:
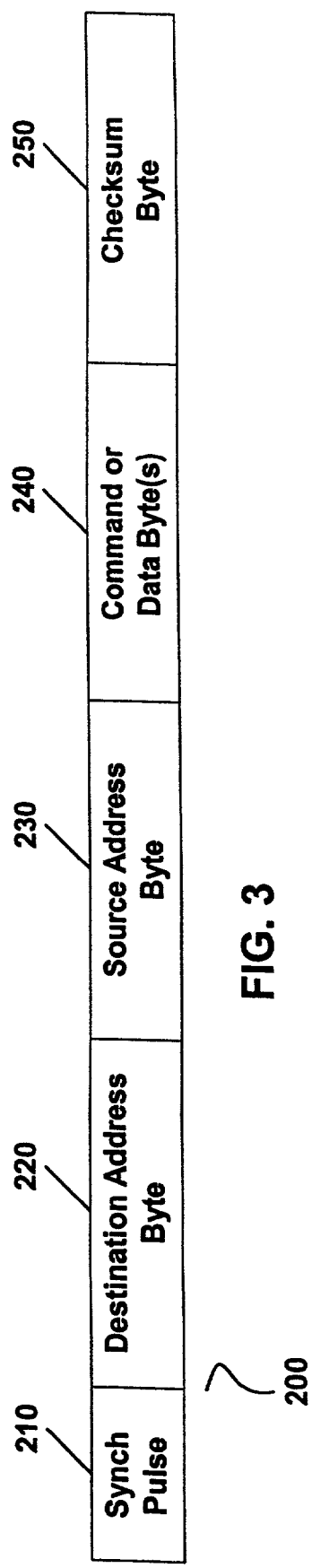
FIG. 3 illustrates the communications packet protocol for the interface bus of the present invention.

FIG. 3 illustrates in greater detail a single communications packet 200 which uses the communications packet protocol for the interface bus of the present invention. It should be noted that the communications packet illustrated in FIG. 3 does not include the start bits which precede each byte, as described earlier in reference to FIG. 2; however, it is preferred that each portion of the communications packet is preceded by a start bit, as shown in FIG. 2. Preferably, the start bit is a zero bit. Further, it should be noted that the same reference numerals are used to describe each portion of the communications packet in FIG. 3 as those used in FIG. 2, where appropriate.

As shown in FIG. 3, a communications packet 200 includes the following subparts: a Synch Pulse 210, a Destination Address 220, a Source Address 230, and a Command/Data 240. As described earlier, the communications packet 200 also preferably includes a Checksum 250 for error detection. Preferably, the Destination Address 220, the Source Address 230, and the Checksum 250 are all one full conventional byte long, while the Command/Data 240 is at least one full conventional byte in length and may be more than one full byte in length. For example, the Command/Data 240 may include a series of testing instructions directed toward an accessory, where the instructions include multiple bytes such that each byte may be a different step in the series of instructions.

Synch Pulse

As described earlier, each communications packet begins with a Synch Pulse 210 for initiating packet transmission, gaining bus control and setting up the packet transmission rate. Preferably, the Synch Pulse 210 is at least three bit widths long. As explained earlier, the interface bus of the present invention is ordinarily pulled high by a pull-up resistor which is preferably implemented within the host adapter base. In the first two bit widths of the Synch Pulse 210, the accessory interface bus is driven low by the transmitting device (the adapter base or one of the accessories coupled to the interface bus). Immediately after these first two bit widths, the device begins transmitting a communications packet over the interface bus. Accordingly, these first two bit widths are included in the communications packet protocol in order to gain control of the bus and ensure that no other messages are being transferred over the bus—i.e. in order to ensure that the bus has not already been driven low by a Synch Pulse 210 transmitted by another device.

The third bit width in the Synch Pulse 210 is a rate bit. The rate bit of the Synch Pulse defines the transmission rate for the remainder of the communications packet. The waveform of the rate bit defines the transmission rate for the communications packet.

Destination/Source Address Bytes

Further included within each communications packet are two addresses, the Destination Address and the Source Address. Preferably, each address is one full byte in length, although it is understood that the interface bus of the present invention may be adapted for expanding the length of each address, thereby allowing more unique addresses to be assigned to accessories as they are coupled to the interface bus.

In a preferred embodiment, the most significant bit (MSB) of each address specifies the type of message, and its possible meaning, depending upon whether it is the MSB in the Source Address 230 or the MSB in the Destination Address 220. As shown and discussed with reference to FIG. 2, the MSB of the Destination Address 220 is a command/data bit 212, while the MSB in the Source Address 230 is the pole response bit 218. Accordingly, it should be noted that since the MSB in each byte is dedicated, only the last seven bits of the Destination Address 220 and Source Address 230 bytes are available for addressing purposes. Therefore, the interface bus of the present invention is preferably configured for allowing up to 128 different devices to be connected to the bus line (including the microprocessor of the headset adapter); although, as explained earlier, some of the addresses may be reserved for special addressing functions.

Special Addressing Functions

It may be desirable to have the headset adapter base communicate with all accessories coupled to the interface bus at the same time. Alternatively, it may be desirable to have the headset adapter base communicate with all like accessories (all on-line indicators or all telephone call timers for example). Instead of sending the same signal to each accessory individually, a reserved broadcast address, identifying any and all accessories coupled to the interface bus, may be reserved such that any communications packet containing this reserved broadcast address in the Destination Address byte will be received by all accessories coupled to the interface bus. Additionally, broadcast addresses may be reserved for all like accessories—i.e. a first reserved broadcast address for all on-line indicators with a second reserved address for all telephone call timers.

Under these circumstances, all accessories coupled to the interface bus are configured to respond to any communications packet which includes either of these broadcast addresses. For example, all accessories will respond to the all accessories broadcast address, while all on-line indicators will respond to both the all accessories broadcast address and the all on-line indicators reserved broadcast address.

Destination Address

The Destination Address 220 is preferably one full conventional byte in length, wherein the MSB in the Destination Address 220 is a command/data bit 212 (FIG. 2) which is used to define the type of information included in the communications packet. Thus, depending upon the command/data bit 212 (FIG. 2*a*) the communications packet either includes a command or data. If the command/data bit 212 (FIG. 2), which is preferably the MSB in the Destination Address byte 220, is a one bit then the communications packet includes data. If the command/data bit 212 (FIG. 2) is a zero bit then the communications packet contains a command. As explained earlier, one or zero bit values are not defined in the conventional sense of amplitude or logic level; but, instead, are herein defined by their individual waveforms.

The other seven bits in the Destination Address byte 220 indicate the interface bus address which has been assigned to the device for which the communications packet is intended. In other words, these bits indicate the bus address for the device which is targeted to receive the communications packet. As explained earlier, the Destination Address byte 220 may contain a reserved broadcast address indicating that the communications packet is being transmitted to all the accessories coupled to the interface bus.

Source Address

The Source Address 230 is also preferably one full byte in length, wherein the MSB in the byte is a pole response bit 218 (FIG. 2) which is used to define whether the communications packet is in response to a polling of the bus. If the pole response bit 218 (FIG. 2), which is preferably the MSB in the Source Address byte 230 is a one bit then the address which follows is the bus address of an accessory which is responding to a polling command. The other seven bits in the Source Address byte 230 indicate the bus address which has been assigned to the device from which the communications packet was transmitted.

Determining Addresses—Polling Function

The process of polling the interface bus allows the headset adapter base to determine what accessories are coupled to the interface bus at any given time. The interface bus of the present invention includes a polling command which allows the headset adapter to detect when new accessories are coupled to the bus or when accessories previously coupled to the bus have been disconnected. Each time a new accessory is coupled to the interface bus it is assigned its own bus address and, preferably, this occurs in sequential order.

Polling of the bus is conducted by the headset adapter on a regular periodic basis in order to determine whether a new device has been coupled to the bus. Periodically, the headset adapter will issue a polling command to all accessories coupled to the bus. In this case, the Destination Address byte 220 will contain the broadcast address which has been reserved for communicating with all accessories coupled to the interface bus.

Accordingly, each accessory coupled to the bus will receive the polling command and respond. A one bit in the MSB position of the Source Address byte 230 indicates that the address in the Source Address byte 230 is from a device which is actively connected to the interface bus and is responding to the polling command. If a new device, such as an additional accessory, has been coupled to the bus it will respond to the polling command with a communications packet having a one bit in the MSB of the source destination address. The micro-controller 115 (FIG. 1) in the headset adapter will compare addresses received in response to a polling command with previously assigned addresses which are stored in the micro-controller 115 (FIG. 1). If the address is a new address, not previously assigned, the address is recorded by the micro-controller for issuing future control and status request signals to that device.

If a previously connected device does not respond to the polling command, the micro-controller 115 (FIG. 1) will detect that no response has been received from that previously assigned address and may then engage in additional steps and commands in order to determine whether the device has actually been disconnected or is just not responding properly.

Command/Data Bytes

The Command/Data 240 portion is either a command or data which is preferably at least one full byte in length; but, may be multiple bytes. As explained earlier, the command/data bit 212 (FIG. 2) which is preferably the MSB in the Destination Address 220, identifies whether the Command/Data 240 portion contains a command or data. Commands may be accessory-specific, they may be accessory common or they may be common to all accessories coupled to the bus. In other words, commands may be transmitted from the headset adapter to a specific accessory, they may be directed to all like or common accessories (such as all on-line indicators or all telephone call timers) or they may be transmitted to all accessories coupled to the interface bus (as in the case of a polling command).

The MSB in the Command/Data 240 determines whether the command which follows is accessory-specific or common to all accessories. If the Command/Data 240 is a command, as determined by the MSB in the Destination Address 220, and the MSB in the Command/Data 240 is a one bit, then the command which follows is accessory-specific. But, if the Command/Data 240 is a command, as determined by the MSB in the Destination Address 220, and the MSB in the Command/Data 240 is a zero bit, then the command which follows is either common to all like or similar accessories (i.e. a command for all on-line indicators or a command for all telephone call timers) or common to all accessories coupled to the bus (as in the case of the polling command). The address used in the Destination Address 220 will contain either an address recognized by all accessories or an address which is recognized only by certain accessories.

Some of the common commands used by the accessory interface bus of the present invention are set forth later herein, as well as some accessory-specific commands for various headset accessories which may be coupled to the accessory interface bus of the present invention.

Checksum Byte

As explained earlier herein, the communications packet preferably includes a Checksum 250 which may be used to detect transmission errors. The Checksum 250 is preferably one full byte long and represents an encoded version of the communications packet. The Checksum 250 enables any device coupled to the interface bus to easily determine whether there has been an error in transmitting the message. Preferably, the Checksum 250 represents the 1's complement of the addition of all the bytes contained in the Destination Address 220, the Source Address 230 and the Command/Data 240. The Checksum 250 can be expressed in terms of the following mathematical expression:

Checksum=Inverse(Destination Address+Source Address+Command Data)

Accordingly, as each byte in the Destination Address 220, the Source Address 230 and the Command/Data 240 is received, the bytes are summed, and when all bytes have been received the total is inverted, thereby forming a resultant byte. This resultant byte is compared with the Checksum 250 of the communications packet. If the Checksum 250 is not the same as the resultant byte, then the receiving device is alerted.

It should be noted that after some commands are transmitted, an acknowledge handshake hold time may follow in order to allow the receiving device to send an acknowledge handshaking signal to the headset adapter base in order to acknowledge proper receipt of the command. If the comparison of the Checksum 250 indicates an error, the receiving device is alerted to the problem and no acknowledge handshake occurs, thereby indicating that there was a problem in transmission.

Bit Definitions and Waveforms

In accordance with conventional definitions, a single byte preferably consists of eight bits. However, it is understood that each of the segments in the communications packet may be more than a single byte in length, as necessary. For example, the address bytes may be increased to multiple byte addressing as additional bus addresses become available.

In the communications packet protocol for the interface bus of the present invention, there are three different types of bits, a rate bit, a zero bit and a one bit. As explained earlier, each bit is defined in accordance with its waveform rather than its logic level. Generally, all three types of bits (rate, zero and one) have at least one rising edge and one falling edge within a single bit period such that all three bits have a high portion and a low portion in a single bit period. Preferably, the actual bit value of rate, zero, or one is determined in accordance with the length of one of these high or low portions— i.e. the time between a rising and falling edge within a single bit period. In a preferred embodiment, the high portion is used to determine the bit type.

Rate Bit

A rate bit 207 is only found in a Synch Pulse 210 and defines the transmission rate for the remainder of the communications packet. Preferably, the entire bit width or bit period, $T_W$, of the rate bit is inversely proportional to the transmission rate. Accordingly, the period of the rate bit is used to determine the transmission rate for the communications packet. Thus, each accessory can establish its own transmission rate for communicating with the headset adapter base since each communications packet contains a rate bit 207 which indicates the transmission rate for that communications packet.

Moreover, as explained above, the rate bit 207 has a high portion and low portion within a single bit period such that there are rising and falling edges within a single bit period. Preferably, the rate bit is designed such that during one half of the bit period, the rate bit is high and during the other half of the bit period, the rate bit is low. The period between the rising and falling edges is preferably equal to one half of the bit period. Accordingly, the time between the rising and falling edge can be used to accurately determine the transmission rate for the communications packet.

Figure 4:
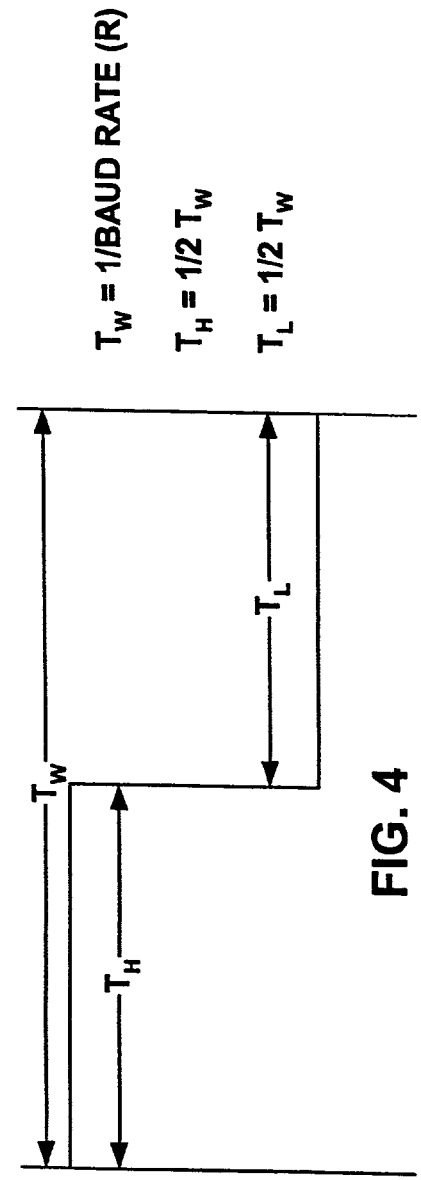
FIG. 4 illustrates the waveform for a rate bit, which is used to determine the actual transmission rate for the remainder of a communications packet transmitted over the interface bus of the present invention.

FIG. 4 illustrates a preferred embodiment of the rate bit waveform. As explained earlier, the rate bit is used to determine the actual transmission rate for the remainder of the communications packet. As shown in FIG. 4, the rate bit has an overall bit width $T_w$, wherein $T_w$ is equal to the inverse of the transmission rate for the communications packet:

$$T_w = 1/R$$

Moreover, the rate bit has a high portion TH and a low portion TL which are preferably optimally each equal to one-half of the M overall bit width Tw.

$$T_H = T_L = \frac{1}{2} T_w$$

In the embodiment shown in FIG. 4, the high portion $T_H$ is shown in the first half of the rate bit, with the low portion $T_L$ in the second half of the rate bit. Although this convention is used hereinafter, it is understood that the rate bit could be reversed such that the low portion $T_L$ occurs first, followed by the high portion $T_H$. The ordering is not essential. The important aspect is that the overall bit width of the rate bit determines the transmission rate for the communications packet, and this bit width can be determined by measuring the period between the rising and falling edges which occur within a single rate bit—wherein the period between such rising and falling edges bears a direct relationship to the overall bit width or period and is preferably equal to approximately one-half of the overall bit width.

Rate Bit Tolerance

Preferably, the bit width of a rate bit transmitted by any accessory coupled to the interface bus of the present invention is $T_{W1}$ and is related to the bit width of a rate bit which is transmitted by the headset adapter base, which is $T_{W0}$. More precisely, in a preferred embodiment, the transmission rate of the accessories coupled to the interface bus are preferably related to the transmission rate of the headset adapter. This way, the micro-controller within the headset adapter will be able to more accurately determine the transmission rates for the various accessories and the overall efficiency of the bus will be improved.

Accordingly, assuming a base adapter transmits a rate bit with a high portion of $T_{H0}$ and a low portion of $T_{L0}$, any accessory coupled to the accessory interface bus of that headset adapter would preferably have high and low bit portions, $T_{H1}$ and $T_{L1}$, as follows:

$$0.35 T_{H0} < T_{H1} < 0.65 T_{H0}$$

$$T_{L1} = T_{W1} - T_{H1}$$

A specific example is herein provided for further illustration. In this specific example, it is assured that a headset adapter has a preferred transmission rate of 4800 bps. If the adapter base were able to constantly transmit at exactly 4800 bps, then the rate bit of such an adapter would have an ideal bit width, $T_{ideal}$ of 208.33 μS. However, it is understood that due to minor variations, the adapter base may not always transmit at exactly the same rate. Accordingly, the actual width of each rate bit transmitted by the adapter base may vary somewhat. Moreover, the transmission rate of various accessories coupled to the accessory interface bus in this example will preferably be somewhat related to the transmission rate of the host adapter base. In this way, one very slow accessory is not coupled to the bus and will not slow down bus operations for all other accessories coupled to the bus; and, one very fast accessory is not coupled to the bus thereby causing transmission errors between the accessory and the adapter base.

In reference to this specific example, the following table provides a chart showing the preferred tolerances for a rate bit waveform high and low portions for a rate bit transmitted by an adapter base and any accessories coupled to the interface bus:

|  | Adapter Base Tolerance | Accessories Tolerance |
|---|---|---|
| High Portion of Rate Bit | $.45T_{IDEAL} < T_{H0} < .55T_{IDEAL}$ | $.35T_{IDEAL} < T_{H1} < .65T_{IDEAL}$ |
| Low Portion of Rate Bit | $T_{L0} = T_{W0} - T_{H0}$ | $T_{L1} = T_{W1} - T_{H1}$ |

As shown above, the tolerances for a rate bit transmitted by any accessory coupled to the interface bus differs from the tolerances for a rate bit transmitted by the headset adapter base. Accordingly, in the above example, accessories are allowed a greater deviation from the ideal bit width, $T_{IDEAL}$ (which as explained in this example is equal to 208.33 μs). This general principle remains constant regardless of the actual transmission rate of the adapter base.

Zero/One Bits

As described earlier, one and zero bits are each defined by their individual Waveforms. The definitions for one and zero bit waveforms are consistent regardless of whether the bits are transmitted by an accessory coupled to the interface bus or the adapter base. Each zero or one bit includes both a high phase and a low phase, such that there is a rising edge and a falling edge within a single bit period. In a preferred embodiment, the duration of the high phase of either a one bit or a zero bit is directly related to the transmission rate of the accessory. Accordingly, the duration of the high phase in both the one bit and the zero bit is directly related to the rate bit. If the duration of the high phase falls within a first range then the bit is determined to be a zero bit; and, if the duration of the high phase falls within a second range then the bit is determined to be a one bit. Accordingly, the actual bit value of zero or one is determined by the duration or length in time of the high phase rather than the amplitude.

In practice there are at least two different preferred methods used to determine a bit's value of one or zero. In the first preferred method, each bit starts with a high phase and ends with a low phase. Accordingly, each bit starts with a rising edge. Whenever the rising edge is detected, this signals to the adapter base that a new bit is being transmitted. The voltage on the bi-directional signaling line of the interface bus is then measured at the same point in time from such rising edge as that point where the falling edge in the rate bit occurred.

Using this method, it is understood that the rate bit had a falling edge which indicated the transmission rate of the packet. This was defined by the overall bit width of the rate bit. The rate bit included a rising edge at the start of the bit, and a falling edge located at approximately the half way point between the overall bit width. The duration of time between the rising and falling edges in the rate bit were used to define the transmission rate of the communications packet. This duration of time can also be used to define the values for each of the bits. Assuming each bit has an initial rising edge, if the voltage on the bi-directional signaling line is measured at the same time from the rising edge as the duration of the falling edge in the rate bit, the individual bit values can be accurately determined. Preferably, if the value of the voltage on the signaling line is still high at this point in time, the bit value is a one. But, if the voltage has been driven low, then the bit value is a zero.

Using a second preferred method for determining bit values, each bit preferably starts with a high phase portion and ends with a low phase portion. The duration of this high phase portion can be accurately determined by measuring the time between a rising edge and a falling edge within a single bit period. If the duration of this high phase portion falls within a first range, the bit is determined to be a zero. If the duration of this high phase portion falls outside of the first range, the bit is determined to be a one.

It is understood that although thus far the determination of bit value has been described with reference to the duration of the high phase. In an alternative embodiment, the duration of the low phase of either a one bit or a zero bit may be directly related to the transmission rate of the accessory or adapter base such that if the duration of the low phase falls within a first range then the bit is determined to be a zero bit; and, if the duration of the low phase falls within a second range then the bit is determined to be a one bit. In this alternative embodiment, it is understood that polarity would be reversed and the interface bus would preferably be ordinarily driven low when no transmission occurs and actively driven high when transmitting.

Figure 5:
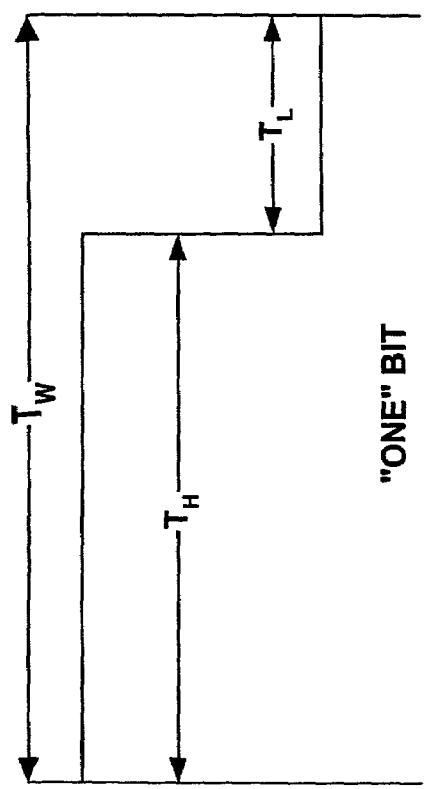
FIG. 5 illustrates bit waveforms for both a zero bit and a one bit in the communications packet protocol for the interface bus of the present invention.
Figure 5:
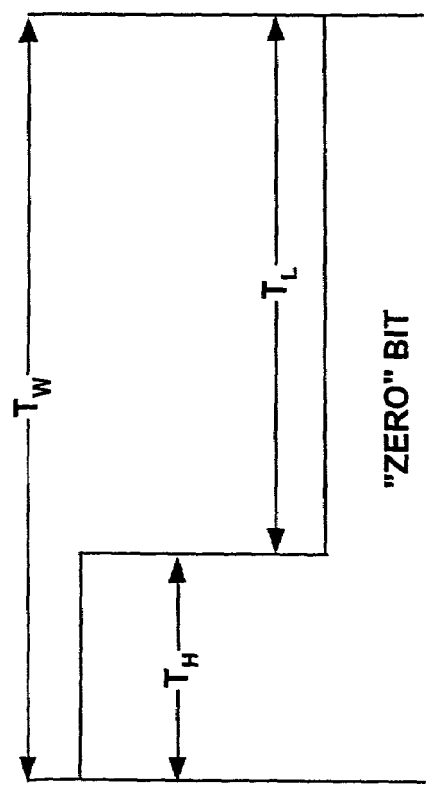

FIG. 5 illustrates bit waveforms for both a zero bit and a one bit. As shown, both the zero and one bit have a high phase and a low phase. Additionally, in the embodiment illustrated in FIG. 5, the high phase is the initial phase, while the low phase is the subsequent phase. It is understood that the high phase and the low phase may be reversed. It is only important that the duration of at least one of either of the phases—high or low—be related to the transmission rate.

Preferably, the high phase of the zero bit is shorter than the high phase in a rate bit—i.e. preferably the time between the rising edge and the falling edge in the zero bit is shorter than the amount of time between a rising edge and a falling edge in a rate bit. Conversely, preferably the high phase of the one bit is longer than the high phase in a rate bit—i.e. preferably the time between the rising edge and the falling edge in the one bit is greater than the amount of time between a rising edge and a falling edge in a rate bit.

Figure 6:
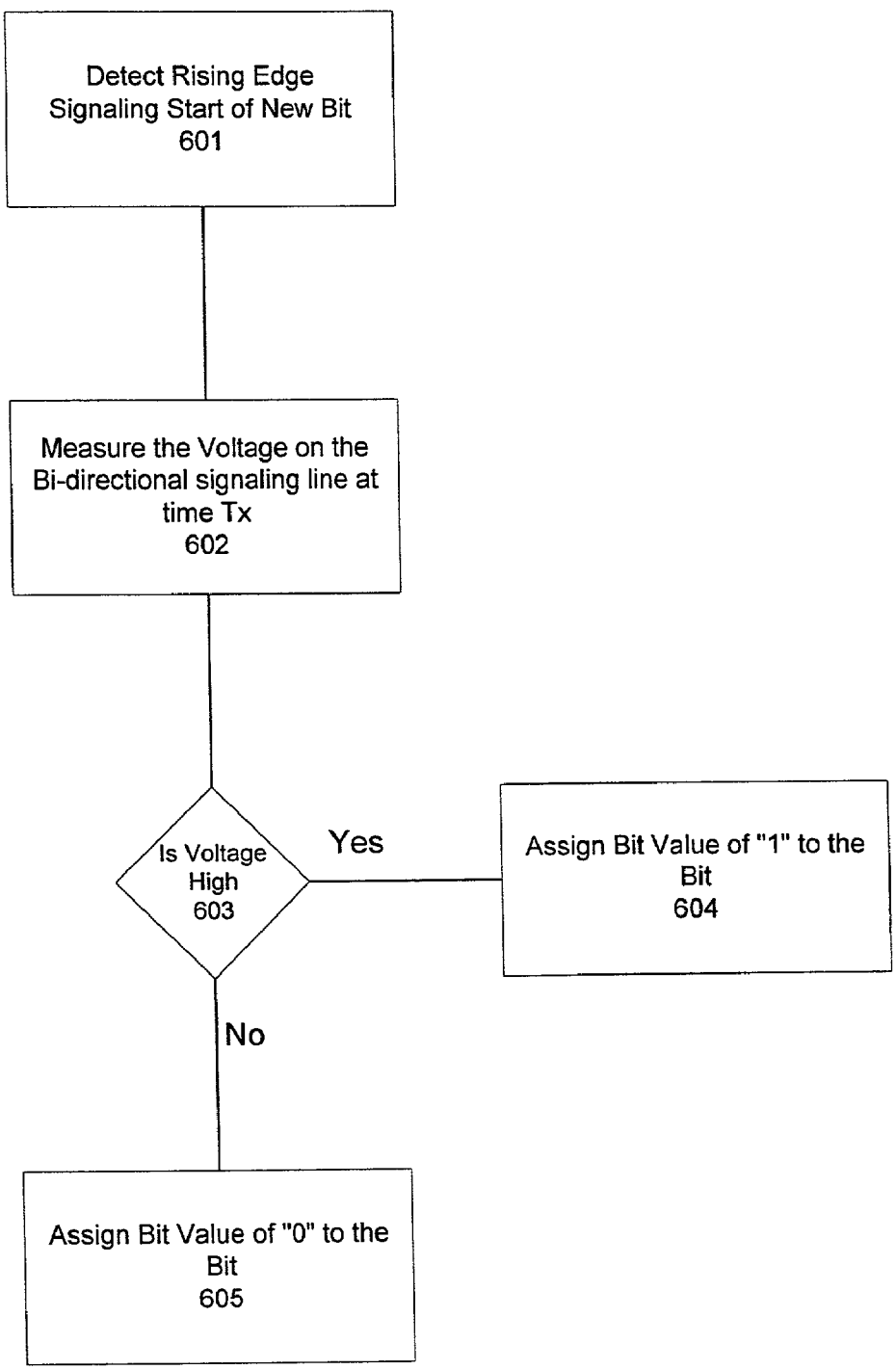
FIG. 6 illustrates a flow diagram showing how bit values are determined using the interface bus and communications packet protocol of the present invention.

FIG. 6 illustrates a flow diagram illustrating the preferred method of detecting bit values. As shown, the bi-directional signaling line is monitored and a rising edge is first detected 601. The voltage on the bi-directional signaling line of the interface bus is measured at some point in time, Tx, from the rising edge 602, where Tx is approximately equal to $T_H$ of a rate bit. If the voltage on the bi-directional signaling line of the interface bus at the time $T_H$ 603 is still high, the bit is assigned a bit value of one 604. However, if the voltage on the bi-directional signaling line of the interface bus at the time $T_H$ 603 has gone low, then the bit is assigned a bit value of zero 605.

Zero and One Bit Tolerances

Referring once again to the example from above, in which the adapter base has an ideal transmission rate of 4800 bps, and an ideal bit width $T_{IDEAL}$ of 208.33 μs, below is a chart showing the preferred tolerances for the duration of the high phase and the low phase of a zero bit and a one bit. The tolerances are given for zero and one bits which may be transmitted by either the host adapter base or any accessories coupled to the interface bus.

|  | Adapter Base Tolerance | Accessories Tolerance |
|---|---|---|
| Zero | $.15T_{IDEAL} < T_{H0} < .25T_{IDEAL}$<br>$T_{L0} = T_W - T_{H0}$ | $.05T_{IDEAL} < T_{H1} < .35T_{IDEAL}$<br>$T_{L1} = T_W - T_{H1}$ |
| One | $.75T_{IDEAL} < T_{H0} < .85T_{IDEAL}$<br>$T_{L0} = T_W - T_{H0}$ | $.65T_{IDEAL} < T_{H1} < .95T_{IDEAL}$<br>$T_{L1} = T_W - T_{H1}$ |

As before, accessories are given a higher degree of variation then the host adapter base. Additionally, the tolerances for the high and low portions are shown relative to the ideal bit width $T_{IDEAL}$. Accordingly, for an ideal bit width of 208.33 μS the high phase, $T_H$, for each of the zero and one bits, respectively, would be as follows:

|  | Adapter Base | Headset Accessories |
|---|---|---|
| "ZERO" bit | 31.2 μS < $T_{H0}$ < 52.0 μS | 10.4 μS < $T_{H1}$ < 71.8 μS |
| "ONE" bit | 156 μS < $T_{H0}$ < 176.8 μS | 135.2 μS < $T_{H1}$ < 197.6 |

Bus Arbitration

Since transmission and reception of packets are being accomplished over a single bi-directional signaling line by both the headset adapter and all accessories coupled to the interface bus, a multilevel system of bus arbitration is provided by the interface bus of the present invention. Bus arbitration is accomplished through a combination of collision avoidance techniques and collision detection mechanisms. Collision avoidance techniques ensure that only one device coupled to the interface bus communicates over the bus at any one time. Collision detection mechanisms are used to detect when transmission errors have occurred which might have been caused by multiple devices attempting to transmit over the interface bus at the same time.

Collision Avoidance Techniques

Collision avoidance is preferably accomplished in the present invention in two different ways: random delay and an acknowledge signal hold time with acknowledge signal handshaking for critical commands. Each of these collision avoidance techniques shall now be described in greater detail.

Preferably, each accessory coupled to the interface bus delays a random amount of time before initiating transmission of any communications packet over the interface bus. Accordingly, whenever an accessory receives any type of status request or command requiring a response, the accessory delays a random amount of time before initiating a response. The purpose of the delay time is to stagger accessory responses to status requests or command signals, thus allowing a higher probability of collision avoidance success.

After a communications packet containing a command byte has been transmitted to a headset accessory, the interface bus cannot be accessed by any other accessory for a period of time—the acknowledge handshake hold time $T_{ack}$—so the receiving accessory may provide an acknowledge handshaking signal to the initiating device (the device which sent the command). FIG. 2 illustrates the acknowledge handshake hold time and an acknowledge handshaking signal.

During the acknowledge handshake hold time, only the intended recipient of the command can access the interface bus in order to transmit an acknowledge handshaking signal back to the initiating device. This simple acknowledge handshaking signal only means the headset accessory has received the command, as intended, and the command was transmitted properly—i.e. no transmission errors were detected in evaluating the checksum byte. This acknowledge handshaking signal does not indicate that the command has been properly executed; but, instead, merely verifies the proper transmission of the command. In some commands, a separate command completed response may be sent, as described further below, in order to verify proper execution of a command. A preferred acknowledge handshake hold time may be 150 microseconds +/−75 microseconds.

Collision Detection

Bus arbitration for the interface bus of the present invention involves a two level scheme which includes collision avoidance and collision detection. Preferably, there are two primary mechanisms used by the interface bus of the present invention in order to detect a collision. These techniques are detection of errors in the Checksum and failure of an acknowledge handshaking signal.

As explained earlier, the Checksum is an encoded version of the communications packet which is one byte long. An error in the Checksum indicates that there has been an error in transmission which may have been caused by collision between two communications packets when more than one device is trying to transmit over the interface bus at the same time.

Additionally, after a communications packet containing a command byte has been transmitted to a headset accessory, the interface bus cannot be accessed by any other accessory for a period of time so the receiving accessory may provide an acknowledge handshake signal to the initiating device. This simple handshake acknowledge signal only means the headset accessory has received the command—i.e. no transmission errors were detected in evaluating the Checksum. If the initiating device does not receive the handshake acknowledge signal within the acknowledge handshake hold time, this may indicate a collision has occurred between two or more communications packets over the interface bus.

Command Set

The command structure for the accessory bus preferably includes two categories of commands: common commands and accessory specific commands. Accessory specific commands may be directed to an individual accessory using that accessory's bus address or they may be directed to all like accessories (i.e. all telephone call timers or all on-line indicators) using a recognizable broadcast address. Additional command categories may be developed in the future as necessary.

The table below shows the full range of commands which are preferably supported by the interface bus of the present invention. Command numbers 1 through 12, and 125 through 129 represent common commands (with command numbers 13 through 124 set aside for additional common commands); while command numbers 130 through 254 represent accessory specific commands, some of which may be later added as additional headset accessories are developed.

| Common Command Set | | |
|---|---|---|
| Command | CMD# | Description |
|  | 0 | Reserved for error detection |
| Reset (POR) | 1 | Soft Reset of the accessory's processor |
| RQ. Version | 2 | Return of Processor's software version |
| RQ. Country Code | 3 | Return of Accessories target country code |
| RQ. OEM# | 4 | Special number assigned to OEM customers |
| Peripheral On | 5 | This should activate the Accessory |
| Peripheral Off | 6 | This should be-activate the Accessory |
| Read EEPROM | 7 | Read a byte from the EEPROM |
| Write EEPROM | 8 | Write to a byte of the EEPROM |
| RQ. EEPROM Size | 9 | Query the size of an EEPROM |
| Button Press | 10 | Simulate a button press |
| Polling Command | 11 | Used to poll the bus in order to detect devices present. |
| Noise Expected | 12 |  |
|  | 13-124 | Reserved for future expansion |
| Command Received | 125 | Used to acknowledge receipt of critical commands |
| Command Complete | 126 | Used to acknowledge completion of the command after execution |
| Request Status | 127 | Request the accessory's status byte |
| Disable Feature | 128 | Allows an accessory to take over bus control |

-continued

Common Command Set

| Command | CMD# | Description |
|---|---|---|
| Enable Feature | 129 | Transfers control from an accessory back to adapter base |
| Query Feature | 130 | Determines control state of adapter base |
| | 131-254 | Accessory Specific Command Sets |
| | 255 | Reserved |

The common commands may theoretically be sent by or to any accessory on the bus. Although some commands may be meaningless for a given accessory, it must still at least acknowledge receipt of a common command using acknowledge handshaking as described earlier.

CMD#0 Reserved for Error Detection

This CMD number has been reserved for the purpose of making collision detection. In the case of a collision it is possible that the resulting data stream will consist of all zero bits. Accordingly is it preferred to assign a communications packet having all zeroes to CMD#0 which may be used to detect errors in transmission.

CMD#1 Reset

This command requests that the accessory perform a self reset. This usually consists of the firmware within the accessory jumping to its reset address and thus re-initializing any and all peripherals which may be attached to the accessory. This command would normally be broadcast to all accessories on the bus and the command will normally use the broadcast address for all accessories.

Reset Command Format

| Field | Contents |
|---|---|
| To: | Usually use broadcast address for all accessories |
| From: | originating address |
| CMD: | 1 |
| Data: | None |

CMD#2 Request Version

This command requests that an accessory respond by providing its firmware version number.

Request Version Command Format

| Field | Contents |
|---|---|
| To: | Target Accessory address |
| From: | Originating address |
| CMD: | 2 |
| Data: | None |

An accessory's response to a Request Version command should have the format shown in the table below. Note that the firmware version number may have two parts, minor and major; and, in this case, the Command/Data in the response will actually have two bytes, with the first byte including the major firmware version number and the second byte including the minor firmware version number.

Request Version Response Format

| Field | Contents |
|---|---|
| To: | Address of original requesting device |
| From: | Responding Accessory Address |
| Data: | Byte 0—Major version |
| | Byte 1—Minor version |

CMD#3 Request Country Code

This command is usually sent to a specific accessory. It allows for some customization of accessory functionality based on the target market for the particular product. Preferably, an accessory will respond with its country code, thereby identifying any limiting attributes. The country code is preferably limited to a single byte, although it may be possible to extend the length in order to use the standard international country codes. Universally defined values for country codes may be defined at a later date. Preferably, a country code of 0 means that the accessory is adapted for "Universal" use in any country with no country specific limiting attributes.

Request Country Code Command Format

| Field | Contents |
|---|---|
| To: | Target Accessory address |
| From: | Originating device address |
| CMD: | 3 |
| Data: | None |

The response from the accessory has the following format:

Request Country Code Response Format

| Field | Contents |
|---|---|
| To: | Address of original requesting device. |
| From: | Responding Accessory address |
| Data: | Single byte representing the country code. |

The data byte in the response will preferably have the following format:

Country Code Response Byte

| R2 | R1 | R0 | C4 | C3 | C2 | C1 | C0 |
|---|---|---|---|---|---|---|---|

The Country Code response byte is preferably broken up into major geographical areas—i.e. North America, South America, etc., which are represented by the three most significant bits R2-R0; and country—i.e. Great Britian, United States, etc., which are represented by the four least significant bits, C4-C0.

CMD#4 Request OEM Number

This command instructs the accessory to identify whether the accessory is an OEM variant. This command will preferably be sent to each single accessory at a time; although it would be possible to adapt the command and response to allow for transmission to all accessories at the same time using the "broadcast" address for all accessories.

| Request OEM Number Command Format | |
|---|---|
| Field | Contents |
| To: | Address of Target Accessory |
| From: | Address of Originating device |
| CMD: | 4 |
| Data: | None |

The accessory response has the following format:

| Request OEM Number Command Format | |
|---|---|
| Field | Contents |
| To: | Address of original requesting device |
| From: | Address of Responding Accessory |
| Data: | BYTE 0—OEM identification number |

The OEM identification number in the data byte of the response is a unique OEM identification code or number associated with a particular manufacturer.

CMD#5 Peripheral On

This command is used to activate an accessory. It should cause the accessory to perform its default activation function or start-up routine. No data response from the accessory is required for this message. However, the target accessory will preferably issue a Command Received signal upon receipt of the Peripheral On command and may even be configured to return a Command Complete response upon completion of the command. The form of a Command Received signal and the form of a Comman Complete signal are both described further hereinafter.

| Peripheral On Command Format | |
|---|---|
| Field | Contents |
| To: | Address of Target Accessory |
| From: | Address of originating device |
| CMD: | 5 |
| Data: | None |

CMD#6 Peripheral Off

This command is used to deactivate an accessory and causes the accessory to perform its default deactivation functions. It does not completely turn off the accessory—i.e. power is continually provided to the accessory. It merely instructs an accessory to cease all activity. No data response is required from the accessory for this message; however, the target accessory will preferably transmit a Command Received signal upon receipt of the Peripheral Off command, thereby acknowledging receipt of the command. The form of a Command Received signal is described further hereinafter.

| Peripheral Off Command Format | |
|---|---|
| Field | Contents |
| To: | Address of Target Accessory |
| From: | Address of originating device |
| CMD: | 6 |
| Data: | None |

CMD#7 Read EEPROM

This command is used to read a byte from an accessory's EEPROM or other non-volatile memory structure (if the accessory includes an EEPROM or other non-volatile memory structure). The size of the EEPROM or other non-volatile memory structure which can be addressed using this message is preferably limited to two hundred and fifty six memory address locations since the Command/Data is preferably one byte long. However, it is understood that multiple Command/Data bytes may be transmitted in order to address larger memory sizes.

| Read EEPROM Command Format | |
|---|---|
| Field | Contents |
| To: | Target Accessory |
| From: | Originator |
| CMD: | 7 |
| Data: | Byte 0—Address within EEPROM to be read |

If the accessory does not have an EEPROM or other non-volatile memory structure, the accessory will either ignore the request (although it will preferably still issue an Acknowledge handshaking signal, acknowledging receipt of the request), or the accessory may respond with a fixed value (typically a value containing all zero bits in the returned Command/Data byte). The response has the following format:

| Read EEPROM Response Format | |
|---|---|
| Field | Contents |
| To: | Address of originally requesting device |
| From: | Address of responding accessory |
| Data: | Byte 0—Address for which read requested |
| | Byte 1—Contents of EEPROM location |

CMD#8 Write EEPROM

This command is used to write a byte to an accessory's EEPROM or other non-volatile memory structure (if the accessory includes an EEPROM or other non-volatile memory structure). The size of an EEPROM or other non-volatile memory structure which can be addressed using this message is preferably limited to 256 byte addresses. However, it is understood that multiple Command/Data bytes may be transmitted in order to address larger memory sizes.

TABLE 13

Write EEPROM Command Format

| Field | Contents |
|---|---|
| To: | Address of Target Accessory |
| From: | Address of originating device |
| CMD: | 8 |
| Data: | Byte 0—Address within EEPROM to be written |
| | Byte 1—Value to write to EEPROM |

If an accessory does not have an EEPROM or other non-volatile memory structure, it should ignore the request (although it will still preferably issue an Acknowledge handshaking signal, acknowledging receipt of the request). If the accessory does have an EEPROM or other non-volatile memory structure, the response has the following format:

Write EEPROM Response Format

| Field | Contents |
|---|---|
| To: | Address of originally Requesting device |
| From: | Address of responding Accessory |
| Data: | Byte 0—Address written to byte |
| | Byte 1—Value written byte |

As shown, the response includes two bytes in the Command/Data byte portion, including an address written to byte and a value written byte. The address written to byte simply returns the EEPROM address where the information has been written to, while the value written data byte contains the results of a read-back from the EEPROM in order to verify that the information was correctly written to the EEPROM. This obviates the need for the requester to do a separate read for verification purposes.

CMD#9 Request EEPROM Size

This command is used to determine the size of an accessory's EEPROM or other non-volatile memory structure.

Request EEPROM Size Command Format

| Field | Contents |
|---|---|
| To: | Address of Target Accessory |
| From: | Address of Originating accessory |
| CMD: | 9 |
| Data: | None |

If an accessory does not have an EEPROM or other non-volatile memory structure, it should respond with a value of zero to indicate this. The response has the following format:

Request EEPROM Size Response Format

| Field | Contents |
|---|---|
| To: | Address of requesting device |
| From: | Address of Responding Accessory |
| Data: | Byte 0 - size of EEPROM in bytes, as a power of 2. A value of zero indicates no EEPROM fitted. For example, for a 256-byte EEPROM, this field would contain the value 8. |

CMD#10 Button Press

This command allows an accessory to simulate operations as if a user had actually physically pressed a button on the headset adapter base. The command further allows the headset adapter base to simulate operations as if a user had actually pressed a button on an accessory. Alternatively, this command allows an accessory or the headset adapter base to simulate operations based upon the positioning of a switch or dial or some other control device which when activated or positioned would cause the accessory or headset adapter base to perform a specific function.

As an example, this command can be used by a foot switch accessory to toggle the headset adapter base between headset and handset modes, thereby emulating a button press of the headset adapter.

Button Press Command Format

| Field | Contents |
|---|---|
| To: | Address of Target device (Accessory or Adapter Base) |
| From: | Address of Originating device |
| CMD: | 10 |
| Data: | BYTE 0 - An eight-bit mask indicating which buttons are to be simulated. The meaning of the individual bits in this mask is defined by each accessory. |

CMD#11 Polling Command

This command is the interface bus polling command, which was described earlier herein. This command is always addressed to the broadcast address of all accessories. Although not mandatory, it will normally be sent by the headset adapter base. It requires every accessory on the bus to respond with its assigned bus address. This command allows the adapter base to build a map of which accessories are connected to the interface bus—and thus which features it should support. The adapter base transmits this message periodically or whenever the bus has been quiet for a number of seconds. This allows the bus to quickly respond to accessories being added to or removed from the bus. Additionally, it allows for the adjustment of duplicate addresses in order to avoid collisions. For example, if two accessories were connected to the bus at the same time and had erroneously been assigned the same bus address, the adapter base—upon hearing the response from each accessory—is able to switch one of the accessories to an alternate bus address.

Because this command is issued regularly, it allows the adapter base to define accessories which have just powered up and been added to the bus. After an initial power-up or reset, an accessory may not respond to—or initiate—any message on the bus until it has received a polling command. This avoids potential collisions between duplicate units which may each have been erroneously assigned the same bus address.

Polling Command Format

| Field | Contents |
|---|---|
| To: | Broadcast address for all accessories |
| From: | Address of Adapter Base |
| CMD: | 11 |
| Data: | None |

The response to this command has the following format:

| Polling Response Format | |
|---|---|
| Field | Contents |
| To: | Address of Adapter base |
| From: | Address of responding Accessory (with MSB set to indicate response to polling command) |
| Data: | Byte 0 - Any eight bit random number |

The random number in the data field is simply an added precaution against the worst case collision scenario. For example, as described earlier, should two identical accessories be erroneously assigned the same bus address they will each attempt to respond to the polling command using the same. The adapter base would have no way of knowing that two different accessories have been erroneously assigned the same bus address and are attempting to transmit a response to a polling command at the same time. The random number ensures that both the data field and checksum should differ in all responses, indicating a possible collision. Accordingly, the headset adapter base can detect two different accessories are attempting to respond to the polling command at the same time and can reassign a new bus address to one of the accessories.

CMD#12 Noise Expected

Some accessories may perform actions which induce a large degree of noise on the accessory bus. For example, a remote handset lifter includes a motor which may induce noise onto the accessory bus. This command advises all accessories that noise is expected, and instructs them to ignore the bus for a fixed time period.

| Noise Expected Command Format | |
|---|---|
| Field | Contents |
| To: | Broadcast Address for all accessories |
| From: | Address of Originating Device |
| CMD: | 12 |
| Data: | Byte 0 - Most Significant 8 bits of delay (in milliseconds) |
| | Byte 1 - Least significant byte of delay value (in milliseconds) |

A 16-bit value is used to specify the delay period. Stated in milliseconds, this allows us to specify a delay more than one second. (i.e. motor lifting handset). As shown, this 16-bit delay value is contained in the Command/Data portion (which is preferably two bytes long), with the first byte (Byte 0) containing the most significant eight bits for the delay value and the second byte (Byte 1) containing the least significant eight bits of the delay value.

CMD#125 Command Received

This message is sent in response to any command requiring a positive acknowledgment of its receipt. Unlike the Acknowledge handshaking, which only acknowledges the proper transmission of a command or request, this message acknowledges both proper transmission and receipt of a valid command. A peripheral will issue a Command Received signal indicating that it has received a valid command and will begin executing the command. The Command Received message has the following format:

| Command Received Format | |
|---|---|
| Field | Contents |
| To: | Address of original device which issued a command |
| From: | Address of target accessory which received the command |
| CMD: | 125 |
| Data: | Byte 0 - CMD number for command which being acknowledged |

As shown, the Command/Data portion in the Command Received packet contains the number of the command which was received. Unlike a simple acknowledge handshake, the Command Received contains the address of the peripheral which received the command and the number associated with the command. If the wrong device has received the command or the command which was received and is about to be executed is incorrect, the transmitting or originating device can send a new signal to the responding device instructing it not to execute the command.

CMD#126 Command Completed

This message is sent by a peripheral acknowledging completion of a command for certain commands when it is desirable to have the peripheral acknowledge completion of execution of the command. Unlike either the Acknowledge handshaking or the Command Received, this message acknowledges that the command has been properly and fully executed. A peripheral will issue a Command Complete signal indicating that it has properly executed the command without any problems. The Command Completed message preferably has the following format:

| Command Received Format | |
|---|---|
| Field | Contents |
| To: | Address of original device which issued a command |
| From: | Address of target accessory which received the command |
| CMD: | 126 |
| Data: | Byte 0 - CMD number for command complete execution of which is being acknowledged |

As shown, the Command/Data portion in the Command Completed packet contains the number of the command which was received. Unlike a simple Acknowledge handshake, the Command Complete contains the address of the peripheral which has executed the command and the number associated with the command.

CMD#127 Request Status

This command requires that the target accessory return its current status byte. The format of the status byte differs for each accessory.

| Request Status Command Format | |
|---|---|
| Field | Contents |
| To: | Address of Target Accessory |
| From: | Address of Originating device |
| CMD: | 127 |
| Data: | None |

A device will respond to a Request Status command with a response having the following format:

| Request Status Response Format | |
|---|---|
| Field | Contents |
| To: | Address of originally requesting device |
| From: | Address of Target Accessory |
| Data: | Byte 0 - status byte (format accessory-dependent) |

CMD#128 Disable Feature Command

This command allows any accessory on the interface bus to take over control of the bus and execute those commands/functions which are typically performed by the adapter base. For example, this command would allow another accessory to take over the function of controlling certain accessories or performing a polling function in order to detect which accessories are coupled to the interface bus.

| Disable Feature Command Format | |
|---|---|
| Field | Contents |
| To: | Address of Adapter base |
| From: | Originating Accessory |
| CMD: | 128 |
| Data: | See Data Byte - 0 below |

The Data Byte-0 is preferably defined as follows:

| Data Byte - 0 Format |
|---|

The Data Byte - 0 is preferably defined as follows:

| KEY | | | | | WTR | STAN | OLI |
|---|---|---|---|---|---|---|---|

KEY Keyboard Control
WTR Disable Polling Command
STAN Disable Control of a Remote Handset Lifter
OLI Disable Control of an On-Line Indicator As is seen from the above illustrated format, only four of the eight bits in the Data Byte-0 have been assigned. The additional four bits may be assigned in the future as necessary. Although the first bit location and the last bit location are used in the above illustrated command format, it is understood that the location of the bits may be changed, so long as a particular bit location corresponds with a particular device. In the preferred embodiment, a one in any one of the above bit positions indicates that control of the particular device or function associated that bit position is to be transferred to the accessory originating the command.

It is understood that the Data Byte-0 may be larger than one full data byte as more accessories and functions are developed in order to enable any accessory on the interface bus to take over bus control or assume particular functions of the adapter base.

CMD#129 Enable Feature Command

This command allows any accessory on the interface bus to relinquish control of the interface bus or certainly previously assumed functions back to the adapter base. It is the counterpart to the Disable Feature Command. For example, this command would allow an accessory which had taken over the function of controlling certain accessories or performing a polling function to transfer control back to the adapter base.

| Enable Feature Command Format | |
|---|---|
| Field | Contents |
| To | Address of Adapter base |
| From: | Originating Accessory |
| CMD: | 129 |
| Data: | See Data Byte - 0 below |

The Data Byte-0 is preferably defined as follows:

| Data Byte - 0 Format |
|---|

| KEY | | | | | WTR | STAN | OLI |
|---|---|---|---|---|---|---|---|

KEY Keyboard Control
WTR Disable Polling Command
STAN Disable Control of a Remote Handset Lifter
OLI Disable Control of an On-Line Indicator As is seen from the above illustrated format, only four of the eight bits in the Data Byte-0 have been assigned. The additional four bits may be assigned in the future as necessary. Although the first bit location and the last bit location are used in the above illustrated command format, it is understood that the location of the bits may be changed, so long as a particular bit location corresponds with a particular device. In the preferred embodiment, a zero in any one of the above bit positions indicates that control of the particular device or function associated that bit position is being relinquished back to the adapter base.

CMD#130 Control Query Command

This command allows any accessory on the interface bus to query the adapter base in order to determine which accessories (if any) have assumed control over the interface bus or have assumed certain functions. For example, this command would allow an accessory to determine whether any other accessory had taken over the function of controlling certain accessories.

| Control Query Command Format | |
|---|---|
| Field | Contents |
| To: | Address of Adapter base |
| From: | Originating Accessory |
| CMD: | 130 |
| Data: | See Data Byte - 0 below |

The adapter base will preferably respond by transferring the Data Byte-0 from any last received disable feature or enable feature command. As illustrated earlier, the Data Byte-0 format is preferably defined as follows:

| Data Byte - 0 Format | | | | | | | |
|---|---|---|---|---|---|---|---|
| KEY | | | | WTR | STAN | OLI | |

KEY Keyboard Control
WIR Disable Polling Command
STAN Disable Control of a Remote Handset Lifter
OLI Disable Control of an On-Line Indicator In the preferred embodiment, a zero in any one of the above bit positions indicates that control of the particular device or function associated that bit position is done by the adapter base, while a one in any one of the above bit positions indicates that control of the particular device or function has been assumed by another accessory coupled to the interface bus.

Accessory Specific Commands

Now that some of the common accessory command have been set forth, the commands specified in the following section are specific to a particular accessory. These commands, coupled with the common commands previously set forth make up an entire command set for each accessory. Accessory specific commands may be directed toward all like accessories, where more than one of the same type is coupled to the interface bus, or the accessory specific commands may be directed toward a specific instance of an accessory. Thus, for example, if more than one on-line indicator (OLI) is coupled to the interface bus, au accessory specific command may be directed to all OLI's on the bus (using a common broadcast type address which is assigned to all OLI's) or an accessory specific command may be directed to just one particular OLI. In such a case, all OLI's will be programmed to recognize and respond to at least three addresses; the broadcast address for all devices (as used in a polling command for example), the broadcast address for all OLI's, and the particular address assigned to that OLI.

Additionally, it is understood that the following accessory specific commands are merely exemplary of the types of functions and accessories the interface bus is designed to support and additional accessory specific commands may be implemented beyond those set forth herein. Accordingly, those accessory specific commands set forth in detail below are in no way intended to limit the possible commands specific to each accessory as described further hereinafter.

Headset Adapter Base—Specific Commands

Specific Responses to Common Commands

The headset adapter base preferably responds to those common commands it may receive, as follows:

| Adapter Base Response to Common Commands | |
|---|---|
| Command | Response |
| Reset | Software in adapter base resets, then issues a Polling Command |
| Request Version | Responds appropriately |
| Request Country | Responds appropriately |
| Request OEM # | Responds appropriately |
| Peripheral On | Selects Handset Mode |
| Peripheral Off | Selects Handset Mode |
| Read EEPROM | Responds appropriately |
| Write EEPROM | Responds appropriately |
| RQ. EEPROM Size | Responds appropriately |
| Button Press | See Button Press Command format given below |
| Polling Command | Responds appropriately |
| Noise Expected | Responds appropriately |

| Adapter Base Response to Common Commands | |
|---|---|
| Command | Response |
| Request Status | See Status Byte format given below |
| Disable Feature | Allows an accessory to take over bus control/specific functions |
| Enable Feature | Transfers control from an accessory back to adapter base |
| Query Feature | Determines control state of adapter base |

Button Press Command Options

The headset adapter base allows the interface bus to be used in order to simulate the operations associated with the pressing of any of its buttons, flipping of any switches or positioning of any dials which may be present on the headset adapter base. The buttons, switch or dial are toggled through this command, and their respective functions performed as if the button, switch or dial had actually been activated. The command is preferably formatted as follows:

| Button Press Command | | | | | | | |
|---|---|---|---|---|---|---|---|
| HDS | MUT | UP | DWN | MOD | — | — | — |

HDS Headset/Handset switch
MUT Mute Switch
UP "+"/Up switch
DWN "–"/down Switch
MOD "Mode" switch As is seen from the above illustrated format, only five of the eight bits are presently assigned. The additional three bits may be assigned in the future as necessary. Although the first five bit locations are used in the above illustrated command format, it is understood that the location of the bits may be changed, so long as a particular bit location corresponds with a particular button press. In the preferred embodiment, a one bit value in any one bit position indicates that is the corresponding switch which is to be toggled.

Status Byte Format

If the adapter base receives a Request Status command, the returned byte preferably contains the following information:

| Adapter Base Status Byte | | | | | | | |
|---|---|---|---|---|---|---|---|
| HDS | MUT | CNV | — | — | — | — | — |

HDS = a one bit if the adapter base is in Headset mode, otherwise a zero bit
MUT = a one bit if the adapter base is currently muted, otherwise a zero bit
CNV = a one bit if the adapter base believes a conversation is in progress As is seen from the above illustrated format, only three of the eight bits are presently assigned. The additional five bits may be assigned in the future as necessary. Although the first three bit locations are used in the above illustrated command format, it is understood that the location of the bits may be changed, so long as a particular bit location corresponds with a particular functional status of the host adapter base.

Status Change

This command causes the headset adapter base be informed of a peripheral's status change. This command would allow the base to be informed of the status change immediately upon a state change in a peripheral as opposed to waiting for the response to a status request command.

Status Change Command Format

| Field | Contents |
|---|---|
| To: | Address of Adapter Base |
| From: | Address of Originating accessory |
| CMD: | 129 |
| Data: | Status byte from accessory |

Start Ring Command

This command instructs the host adapter base to begin generating a ringing tone (if supported). This command would allow the adapter base to replicate a phone's ring-tone sequence in the user's headset. This feature would be especially useful in the case of a wireless headset user, who may be out of audible range of their phone but wearing their headset.

Start Ringing Command Format

| Field | Contents |
|---|---|
| To: | Address of Adapter Base |
| From: | Address of Originating device |
| CMD: | 130 |
| Data: | None |

Stop Ringing Command

This is the companion to the "Start Ringing" command. If a user picks up the call or a certain number of pre-selected rings has occurred without answer, then an originating device (perhaps a hookswitch or telephone call timer) will send this message to the adapter base, instructing the adapter base device to stop generating the ringing tone.

Stop Ringing Command Format

| Field | Contents |
|---|---|
| To: | Address of Originating Accessory |
| From: | Address of Adapter base |
| CMD: | 131 |
| Data: | None |

Remote Handset Lifter—Accessory Specific Commands
Specific Responses to Common Commands A remote handset lifter preferably responds to those common commands it may receive, as follows:

Remote Handset Lifter Response to Common Commands

| Command | Response |
|---|---|
| Reset | Responds appropriately |
| Request Version | Responds appropriately |
| Request Country | Responds appropriately |
| Request OEM # | Responds appropriately |
| Peripheral On | Lifts handset |
| Peripheral Off | Lowers handset |
| Read EEPROM | No response |
| Write EEPROM | No response |
| RQ. EEPROM Size | Returns size of zero |

-continued

Remote Handset Lifter Response to Common Commands

| Command | Response |
|---|---|
| Button Press | No response |
| Polling Command | Responds appropriately |
| Noise Expected | Responds appropriately |
| Request Status | See Status Byte format below |

Status Byte Format

A remote handset lifter will respond to a Request Status command with a status byte having the following format:

Remote Handset Lifter Status Byte

| RDE | CSE | — | — | — | CS | AR | DA |
|---|---|---|---|---|---|---|---|

RDE = a one bit if remote lifter has ring detection circuit, otherwise a zero bit
CSE = a one bit if remote lifter has a Cradle Switch in hardware, otherwise a zero bit.
CS = a one bit if the handset detection sensor is active, a zero bit if inactive.
AR = a one bit if the ring detection circuit is active, a zero bit if inactive.
DA = a one bit if the remote lifter is in the Off-Hook position, a zero bit if in the On-Hook position.

As is seen from the above illustrated format, only five of the eight bits are presently assigned. The additional three bits may be assigned in the future as necessary. It is understood that the location of the bits may be changed, so long as a particular bit location corresponds with a particular functional status of the remote handset lifter.

On-Line Indicator (OLI)—Accessory Specific Commands

An On-Line Indicator may include a single LED or multiple LEDs configured to display a series of patterns. For example an eight segment numerical display may be utilized. In a multiple LED configuration, the LEDs may be configured to light alternating patterns in a particular sequence or the OLI may light a predetermined pattern in order to indicate a particular state. For example, the multiple LEDs may be configured to flash a particular pattern or number to indicate a call is on hold.

Specific Responses to Common Commands

An OLI will preferably respond to those common commands it may receive as follows:

OLI Response to Common Commands

| Command | Response |
|---|---|
| Reset | Responds Appropriately |
| Request Version | Responds Appropriately |
| Request Country | Responds Appropriately |
| Request OEM # | Responds Appropriately |
| Peripheral On | Starts displaying default pattern |
| Peripheral Off | Becomes inactive |
| Read EEPROM | No response |
| Write EEPROM | No response |
| RQ. EEPROM Size | Returns a size of zero |
| Button Press | No response |
| Polling command | Responds Appropriately |
| Noise Expected | Responds Appropriately |
| Request Status | See Status Byte format below |

Status Byte Format

An OLI will respond to a Request Status command with a status byte having the following format:

| OLI Status Byte | | | | | | | |
|---|---|---|---|---|---|---|---|
| — | — | FE | PE | P3 | P2 | P1 | P0 |

FE = a one bit if the OLI is Enabled with multi-patterns and is fixed to one on activation
FE =a zero bit if the OLI is not Enabled with multi-patterns and is running in random order
PE =a one bit if the OLI is Enabled with multi-patterns
P3-0 These four bits reflect the current pattern the OLI is currently using/displaying or its fixed pattern.

As is seen from the above illustrated format, only six of the eight bits are presently assigned. The additional two bits may be assigned in the future as necessary.

Query Pattern Command

This command queries the OLI to determine which pattern it is currently displaying. The command has the following format:

| Query Pattern Command Format | |
|---|---|
| Field | Contents |
| To: | Address of OLI |
| From: | Address of Originating device |
| CMD: | 129 |
| Data: | None |

The OLI responds to a Query Pattern command with the following format:

| Query Pattern Response Format | |
|---|---|
| Field | Contents |
| To: | Address of Originating device |
| From: | Address of OLI |
| Data: | Byte 0—Current pattern number (0-15) |

Next Pattern Command

This command instructs the OLI to move to the next pattern in its sequence if possible. If the OLI is currently at the last pattern in its sequence, it wraps around to the first pattern. The command has the following format:

| Next Pattern Command Format | |
|---|---|
| Field | Contents |
| To: | Address of OLI |
| From: | Address of Originating device |
| CMD: | 130 |
| Data: | None |

Previous Pattern Command

This command instructs the OLI to move to the previous pattern in its sequence. If the OLI is currently at the first pattern in its sequence, this command causes it to wrap around to the last pattern. The command has the following format:

| Previous Pattern Command Format | |
|---|---|
| Field | Contents |
| To: | Address of OLI |
| From: | Address of Originating device |
| CMD: | 131 |
| Data: | None |

Set Default Pattern

This command causes the OLI to change its default pattern. The new pattern is defined by the data byte.

| Set Default Pattern Command Format | |
|---|---|
| Field | Contents |
| To: | Address of OLI |
| From: | Address of Originating device |
| CMD: | 132 |
| Data: | Byte 0—New pattern in sequence (0.15), or 255 to indicate that the current pattern should become the new default. |

Foot Switch—Accessory Specific Commands

A foot switch accessory allows a user to activate one of the control switches or buttons on a headset adapter base (typically the headset/handset switch) using their foot. Accordingly, the interface bus of the present invention may be used to simulate the toggling of the foot switch back and forth between positions.

Specific Responses to Common Commands

A foot switch accessory will preferably respond to those common commands it may receive as follows:

| Foot Switch Response to Common Commands | |
|---|---|
| Command | Response |
| Reset | Responds Appropriately |
| Request Version | Responds Appropriately |
| Request Country | Responds Appropriately |
| Request OEM # | Responds Appropriately |
| Peripheral On | Acts as if foot-switch pressed |
| Peripheral Off | Acts as if foot-switch released |
| Read EEPROM | No response |
| Write EEPROM | No response |
| RQ. EEPROM Size | Returns size of zero |
| Button Press | See Button Press Command given below |
| Polling Command | Responds Appropriately |
| Noise Expected | Responds Appropriately |
| Request Status | See Status Byte format given below |

Status Byte Format

A foot switch accessory will respond to a Request Status command with a status byte having the following format:

| Foot Switch Status Byte | | | | | | | |
|---|---|---|---|---|---|---|---|
| ME | — | — | — | — | — | — | SA |

ME = a one bit if the foot switch is a Momentary type
+ME = a zero bit if the foot switch is two Position type
SA = a one bit if the foot switch is currently being depressed Presently, only three of the bits in the eight bit response byte have been assigned meaning. The other five bits may be assigned in the future. It is understood, that the ordering of the bits is not important so long as a particular bit position identifies a particular functional status of the foot switch.

Button Press Command

A foot switch accessory can be remotely activated in order to simulate activation of its press button using a button press command. Preferably, the command has the following format:

| Button Press Command Byte | | | | | | | |
|---|---|---|---|---|---|---|---|
| SA | — | — | — | — | — | — | — |

SA = a one bit to simulate press of foot switch
SA = a zero bit to simulate release of foot switch Presently, only one bit in the eight bit response byte has been assigned meaning since a foot switch typically only entails a single switch/button which is activated or released by a user using the foot switch. However, the other seven bits may be assigned in the future in the event a foot switch is designed having multiple functional button press operations or foot switches. Moreover, for simplicity the first bit position in the command has been assigned, while it is understood, that the particular bit position used does not matter so long as it identifies and simulates a particular functional status of the foot switch.

The Telephone Call Timer (TCT)

This accessory preferably provides the ability to time individual telephone calls. This accessory may be configured to monitor the interface bus of the present invention in order to detect any commands from the headset adapter base to the OLI, activating the OLI—i.e. the TCT will begin timing calls once the OLI has been activated. Alternatively, a TCT may be daisy chained with the foot switch in order to automatically begin timing telephone calls whenever the foot switch toggles the adapter base from handset to headset mode—assuming the headset is going to be used for the duration of the call. Otherwise, a TCT may be directly coupled to the incoming phone line in order to detect an incoming call and begin timing the call whenever an off-hook is detected—i.e. whenever the call is picked up.

Other embodiments or configurations are envisioned and may exist. Each of these is intended to fall within the scope of the present invention.

Specific Responses to Common Commands

A TCT accessory will preferably respond to those common commands it may receive as follows:

TCT Response to Common Commands

| Command | Response |
|---|---|
| Reset | Responds Appropriately |
| Request Version | Responds Appropriately |
| Request Country | Responds Appropriately |
| Request OEM # | Responds Appropriately |
| Peripheral On | Begins timer |
| Peripheral Off | Stops Timer |
| Read EEPROM | Responds Appropriately (If fitted) |
| Write EEPROM | Responds Appropriately (If fitted) |
| RQ. EEPROM Size | Responds Appropriately (or returns zero) |
| Button Press | See Button Press Command given below |
| Who's There | Responds Appropriately |
| Noise Expected | Responds Appropriately |
| Request Status | See Status Byte format given below |

Status Byte Format

A TCT accessory will respond to a Request Status command with a status byte indicating its current activation status. The status byte will preferably have the following format:

| Call Timer Status Byte | | | | | | | |
|---|---|---|---|---|---|---|---|
| — | — | — | — | — | — | — | TIM |

TIM = a one bit if TCT is currently timing a call

Button Press Command

A TCT accessory can be remotely activated by any other device on the interface bus in order to simulate a button press of the TCT. Preferably, a button press of the TCT is activated using the following command format:

| Call Timer Button Press Command Byte | | | | | | | |
|---|---|---|---|---|---|---|---|
| RST | BEG | STP | — | — | — | — | — |

RST = a one bit in order to simulate a press of a Reset Timer switch on the TCT
BEG = a one bit in order to simulate a press of a Start-time switch on the TCT
END = a one bit in order to simulate a press of Stop-time switch on the TCT Presently, only three of the bits in the eight bit command have been assigned to correlate with the button press of three different buttons located on the TCT. The other five bits may be assigned in the future as needed. It is understood, that the ordering of the bits is not important so long as a particular bit position identifies a particular button press of the TCT.

Reset Timer Command

This command causes the TCT to reset its elapsed time counter to zero, and begin counting again from that point. The command has the following format:

Reset Timer Command Format

| Field | Contents |
|---|---|
| To: | Address of TCT |
| From: | Address of Originating device |
| CMD: | 129 |
| Data: | None |

Keep Time On Display

This command instructs the TCT to freeze the display with the time of the current call. The command has the following format:

Keep Display Command Format

| Field | Contents |
|---|---|
| To: | Address of TCT |
| From: | Address of Originating device |
| CMD: | 130 |
| Data: | None |

Display Current Call

This command instructs the TCT to update its display to show the elapsed time of the current call. This effectively returns the display to "real time" mode. The command has the following format:

Display Call Command Format

| Field | Contents |
|---|---|
| To: | Address of TCT |
| From: | Address of Originating device |
| CMD: | 131 |
| Data: | None |

Laptop Interface Accessory

The purpose of this accessory is to allow a laptop, or PC to be linked into the accessory bus. One use for this is to replicate the adapter base's control panel on an agent's desktop computer; for example to allow a touch sensitive screen implementation. Another purpose is to allow production test software to program the EEPROM of an accessory during production testing. The laptop is typically a source of commands on the bus, but supports no specific commands itself.

Specific Responses to Common Commands

A laptop interface accessory will preferably respond to those common commands it may receive as follows:

TABLE 40

Laptop Interface Response to Common Commands

| Command | Response |
|---|---|
| Reset | Responds appropriately |
| Request Version | Responds appropriately |
| Request Country | Responds appropriately |
| Request OEM # | Responds appropriately |
| Peripheral On | Ignored |
| Peripheral Off | Ignored |
| Read EEPROM | Ignored |
| Write EEPROM | Ignored |
| RQ. EEPROM Size | Returns a size of 0 |
| Button Press | Ignored |
| Polling Command | Responds appropriately |
| Noise Expected | Responds appropriately |
| Request Status | See Status Byte format given below |

Status Byte Format

The laptop interface accessory has no status information to return. Accordingly, it simply returns a byte having all zero bits in response to a Request Status command.

What is claimed is:

1. A telecommunication system comprising:
a telephone headset;
a headset adapter configured to be coupled to the telephone headset and having an accessory interface bus for transmitting and receiving communications packets, the headset adapter being configured to be coupled to a base telephone; and
an accessory for the telephone headset configured to be coupled to the accessory interface bus of the headset adapter, wherein the accessory is independently and directly controlled and monitored by the headset adapter when the headset accessory is in communication with the headset adapter via the transmission of communications packets between the accessory and the headset adapter over the accessory interface bus, the accessory monitored by transmitting a status monitoring message from the headset adapter over the accessory interface bus to the accessory.

2. The system of claim 1, wherein the accessory interface bus includes at least one bi-directional signaling line for transmitting and receiving the communications packets between the accessory and the headset adapter in order to control and monitor the accessory.

3. The system of claim 1, wherein the accessory interface bus further includes:
a high voltage rail;
a low voltage rail; and
a bi-directional signaling line for transmitting and receiving the communications packets between the accessory and the headset adapter in order to control and monitor the accessory.

4. The system of claim 1, wherein each communications packet includes a synch pulse which defines a transmission rate for the communications packet.

5. The system of claim 4, wherein the synch pulse includes a rate bit having a bit period which defines the transmission rate for the communications packet.

6. The system of claim 5, wherein the rate bit includes a rising edge and a falling edge within the bit period, and further wherein a duration of time between the rising edge and the falling edge is used to determine the bit period which is inversely related to the transmission rate of the communications packet.

7. The system of claim 5, wherein the synch pulse holds the accessory bus at a predetermined level for a predetermined amount of time before the rate bit of the communications packet is transmitted over the accessory bus thereby preventing collision between communications packets.

8. The system of claim 7, wherein the synch pulse holds the accessory interface bus to a low voltage value for at least two bit periods before the rate bit is transmitted in order to prevent collision between communications packets.

9. The system of claim 1, wherein each communications packet includes a source address indicating a bus address of the source of the communications packet, a destination address indicating a bus address of the destination of the communications packet, and a command or data.

10. The system of claim 9, wherein each communications packet further includes a checksum for detecting errors in transmission of the communications packet.

11. The system of claim 1, wherein each communications packet includes a plurality of bits with each bit in the plurality of bits having an assigned value of zero or one, and further wherein each bit includes a first signal portion having a first logic level and a second signal portion having a second logic level and the assigned value of zero or one is assigned to each bit based upon a duration of either the first signal portion or the second signal portion.

12. The system of claim 11, wherein if the duration of the at least one portion falls within a first range the bit is assigned a value of zero and if the duration of the at least one portion falls within a second range, the bit is assigned a value of one.

13. The system of claim 11 wherein each bit in the plurality of bits has a rising edge and a falling edge, and the rising edge and the falling edge are used to synchronize transmission of the communications packet after each bit is transmitted.

14. The system of claim 1, wherein the headset adapter includes a microcontroller coupled to the interface bus, the micro-controller controlling and monitoring the accessory through the transmission and reception of communications packets between the microcontroller and the accessory via the interface bus.

15. An adapter base for a telecommunications headset comprising:
   an interface bus; and
   a micro-controller coupled to the interface bus for independently and directly controlling and monitoring at least one accessory to the telecommunications headset, the at least one accessory being configured to be coupled to the interface bus, wherein the micro-controller independently and directly controls and monitors the at least one accessory when the at least one accessory is in communication with the micro-controller through the bi-directional transmission of communications packets between the micro-controller and the at least one accessory via the interface bus, the adapter base being configured to be coupled to a base telephone, wherein the micro-controller transmits a status monitoring message from the adapter base over the interface bus to the at least one accessory.

16. The adapter base of claim 15, wherein the interface bus includes a high voltage rail, a low voltage rail, and a bi-directional signaling line for transmitting the communications packets back and forth over the interface bus between the micro-controller and the accessory.

17. The adapter base of claim 15, wherein each communications packet includes a synch pulse which defines a rate of transmission for that communications packet.

18. The adapter base of claim 17, wherein the synch pulse includes a rate bit having a bit period which defines the transmission rate for the communications packet.

19. The adapter base of claim 18, wherein the rate bit includes a rising edge and a falling edge within the bit period, and further wherein a duration of time between the rising edge and the falling edge is used to determine the bit period which is inversely related to the transmission rate for the communications packet.

20. The adapter base of claim 17, wherein the synch pulse holds the accessory bus at a predetermined level for a predetermined amount of time before each communications packet is transmitted over the accessory bus in order to gain bus control.

21. The adapter base of claim 15, wherein each communications packet includes a source address indicating a bus address of the source of the communications packet, a destination address indicating a bus address of the destination of the communications packet, and a command or data.

22. The adapter base of claim 21, wherein each communications packet further includes a checksum for detecting errors in transmission of the communications packet.

23. The adapter base of claim 15, wherein each communications packet includes a plurality of bits, with each bit in the plurality of bits having an assigned value of zero or one, and further wherein each bit includes a first signal portion having a first logic level and a second signal portion having a second logic level and the assigned value of zero or one is assigned to each bit is based upon a duration of either the first signal portion or the second signal portion.

24. The adapter base of claim 23, wherein if the duration of the at least one portion falls within a first range the bit is assigned a value of zero and if the duration of the at least one portion falls within a second range, the bit is assigned a value of one.

25. The adapter base of claim 23, wherein each bit in the plurality of bits has a rising edge and a falling edge, and the rising edge and the falling edge are used to synchronize transmission of the communications packet after each bit is transmitted.

26. A telephone headset accessories interface bus for carrying control and monitoring information destined for a telephone headset accessory corresponding to a base telephone, the interface bus being configured to enable the telephone headset accessory to be coupled to a headset adapter via the interface bus, the interface bus enabling direct and independent control and monitoring of the telephone headset accessory by the headset adapter via the interface bus when the telephone headset accessory is in communication with the headset adapter, the telephone headset accessories interface bus being further configured to transmit and receive a plurality of communications packets between the telephone headset accessory and the headset adapter for directly and independently controlling and monitoring the telephone headset accessory by the headset adapter, wherein monitoring the telephone headset accessory comprises transmitting a status monitoring message from the headset adapter over the telephone headset accessories interface bus to the telephone headset accessory.

27. The telephone headset accessories interface bus of claim 26, comprising:
   a high voltage rail,
   a low voltage rail, and
   at least bi-directional signaling line for transmitting and receiving the plurality of communications packets between a headset adapter and the telephone headset accessory, wherein the communications packets are used to control and monitor the telephone headset accessory.

28. The telephone headset accessories interface bus of claim 26, wherein each communications packet in the plurality of communications packets further includes a synch pulse which defines a rate of transmission at which the communications packet is transmitted.

29. The telephone headset accessories interface bus of claim 28, wherein the synch pulse includes a rate bit having a bit period which defines the transmission rate for the communications packet.

30. The telephone headset accessories interface bus of claim 26, wherein each communications packet further includes a source address indicating a bus address of a source of the communications packet, a destination address byte indicating a bus address of a destination of the communications packet, and a command or data.

31. The telephone headset accessories interface bus of claim 30, wherein each communications packet further includes a checksum for detecting errors in transmission of the communications packet.

32. The telephone headset accessories interface bus of claim 26, wherein each communications packet includes a plurality of bits with each bit having a high bit portion and a low bit portion such that each bit has a rising edge and a falling edge within a single bit period, and further wherein the rising edge and the falling edge are used to synchronize transmission of the single communications packet after each bit is transmitted.

33. An interface bus that carries a plurality of communications packets between a headset adapter and a headset accessory, the interface bus enabling the headset adapter to independently and directly control, monitor and test the headset accessory when the headset accessory is in communication with the headset adapter via the interface bus, the headset adapter being configured to be connected to a base telephone, the headset accessory monitored by transmitting a status monitoring message from the headset adapter over the interface bus to the headset accessory.

34. The interface bus of claim 33, wherein each communications packet in the plurality of communications packet has a synch pulse for defining a transmission rate for the communications packet.

35. The interface bus of claim 34, wherein the synch pulse includes a rate bit having a bit period which defines the transmission rate for the communications packet.

36. The interface bus of claim 33, wherein each communications packet includes a source address indicating a bus address of a source of the communications packet, a destination address indicating a bus address of a destination of the communications packet, and a command or data.

37. The interface bus of claim 36, wherein each communications packet further includes a checksum for detecting errors in transmission of the communications packet.

38. The interface bus of claim 33, wherein each communications packet includes a plurality of bits with each bit having an assigned value of one or zero, and further wherein each bit includes a high bit portion and a low bit portion, with the duration of at least one bit portion determining the value of one or zero which is assigned to the bit such that if the duration of such portion falls within a first range the bit is assigned a value of zero and if the duration of such portion falls within a second range, the bit is assigned a value of one.

39. The interface bus of claim 38, wherein each bit in the plurality of bits has a rising edge and a falling edge within a single bit period, and further wherein the rising edge and the falling edge can be used to synchronize transmission of the communications packet after each bit period.

40. A computer readable medium containing executable program instructions for controlling and monitoring an accessory to a telecommunications headset using a headset adapter base and an interface bus, the executable program instructions including instructions for:
   detecting whether an accessory is coupled to the interface bus;
   receiving a communication packet at the headset adapter base over the interface bus from the accessory and identifying from a rate bit in the communication packet a communication packet transmission rate; and
   transmitting a command or status request signal from the headset adapter base over the interface bus and to the accessory detected as being coupled to the interface bus to enable the headset adapter base to independently and directly control and monitor the operation of the accessory, the headset adapter base being configured to be connected to a base telephone, the accessory monitored by transmitting a status monitoring message from the headset adapter base over the interface bus to the accessory.

41. The computer readable medium of claim 40, wherein the command or status request signal is a communications packet having a synch pulse for defining a transmission rate of the communications packet, such that the adapter base communicates with the accessory at its own transmission rate.

42. The computer readable medium of claim 41, wherein the communications packet further includes a source address indicating a bus address of the adapter base and a destination address indicating a bus address of the accessory.

43. The computer readable medium of claim 42, wherein the communications packet further includes a checksum for detecting errors in transmission of the communications packet.

44. The computer readable medium method of claim 41, wherein the communications packet includes a plurality of bits with each bit having a high bit portion and a low bit portion such that each bit has a rising edge and a falling edge within a single bit period, and further wherein the rising edge and the falling edge are be used to synchronize transmission of the command or status request signal after each bit is transmitted.

45. The computer readable medium of claim 40 the executable program instructions further including instructions for:
   detecting any errors in the transmission of the command or status request signal from the adapter base over the interface bus.

46. The computer readable medium of claim 40, the executable program instructions further including instructions for:
   receiving a response signal from the accessory returning information on the current status for the accessory when a status request signal is transmitted.

47. The computer readable medium of claim 46, wherein the response signal is a communications packet having a synch pulse for defining a transmission rate of the communications packet, such that the accessory communicates with the adapter base at its own transmission rate.

48. The computer readable medium of claim 47, wherein the communications packet further includes a checksum for detecting errors in transmission of the communications packet from the accessory to the adapter base.

49. The computer readable medium of claim 46, wherein the communications packet further includes a source address indicating a bus address of the accessory and a destination address indicating a bus address of the adapter base.

50. The computer readable medium of claim 40, the executable program instructions further including instructions for:
   holding the interface bus at a predetermined voltage level for a predetermined amount of time after a command signal is transmitted to the accessory, in order to allow the accessory to acknowledge receipt of the command signal.

51. A headset adapter for communicating with a headset accessory via an accessory interface bus, the headset accessory being configured to correspond to a base telephone, the accessory interface bus being configured to transmit a data packet for controlling, monitoring, or testing the operations of the headset accessory, the data packet including:
   a synch pulse having a rate bit that defines a rate at which the data packet is being transmitted;
   a source address byte that represents a bus address of a device from which the data packet was transmitted; and
   a destination address byte that represents a bus address of the headset accessory to which the data packet is being transmitted,
   wherein the data packet transmitted over the accessory interface bus enables the headset adapter to directly and independently control, monitor and test the operations of the headset accessory, the headset accessory monitored by transmitting a status monitoring message from the headset adapter over the accessory interface bus to the headset accessory.

52. The data packet of claim 51, further comprising a checksum byte for detecting errors in transmission of the data packet.

53. The data packet of claim 51, further comprising a plurality of bits with each bit having an assigned value of one or zero, wherein each bit has a high bit portion and a low bit portion within a single bit period, with the duration of at least one bit portion determining the value of one or zero which is assigned to the bit such that if the duration of the at least one bit portion falls within a first range the bit is assigned a value of zero and if the duration of the at least one bit portion falls within a second range, the bit is assigned a value of one.

54. The data packet of claim 53 wherein each bit in the plurality of bits has a rising edge and a falling edge within the single bit period, said rising edge and falling edge used to synchronize transmission of the data packet after each bit is transmitted.

55. A headset adapter for communicating with a plurality of telephone headset accessories via a telephone headset accessories interface bus utilizing a communications protocol implemented by the headset adapter and the headset accessories, the protocol including a plurality of commands to independently and directly perform control, monitoring or identification of any one of the plurality of accessories, the telephone headset accessories corresponding to a base telephone, the telephone headset accessories monitored by transmitting a status monitoring message from the headset adapter over the telephone headset accessories interface bus to the telephone headset accessories.

56. The communications protocol of claim 55, wherein the plurality of commands includes common commands for controlling and monitoring anyone of the plurality of accessories and accessory specific commands for controlling and monitoring a specific accessory in the plurality of accessories.

57. The communications protocol of claim 56 wherein the common commands include:
a command for polling the interface bus and detecting each of the plurality of accessories; and
a command for resetting each of the plurality of accessories.

58. The communications protocol of claim 56 wherein the common commands include:
a command for requesting a firmware version number from each accessory in the plurality of accessories.

59. The communications protocol of claim 56 wherein the accessory specific commands include:
a command for turning the specific accessory on or off;
a command for resetting the specific accessory; and
a command for requesting the status of the specific accessory.

60. The communications protocol of claim 56 wherein the accessory specific commands include a command for simulating a button press of the specific accessory.

61. The communications protocol of claim 56 wherein the accessory specific commands include:
a command for writing data to a memory within the specific accessory; and
a command for reading data from a memory within the specific accessory.

62. A combination comprising:
an interface bus configured to have a telephone headset adapter base and a plurality of accessories for the headset adapter base coupled to the interface bus, the telephone headset adapter base corresponding to a base telephone, and
a headset adapter base and a plurality of accessories, each of the headset adapter base and the accessories implementing a communications protocol to enable the telephone headset adapter base to independently control and monitor operations of the plurality of accessories via the interface bus, the communications protocol including at least one command selected from the group of commands comprising of:
a command for turning an accessory on or off;
a command for polling the interface bus in order to determine what accessories are coupled to the interface bus;
a command for simulating operations as if a button, a switch or a an accessory had been activated;
a command for simulating operations as if a button, a switch of a dial on the adapter base had been activated;
a command for resetting an accessory;
a command for determining the status of an accessory;
a command for reading from or writing to a memory structure within an accessory; and
a command for determining the identity and version of each accessory.

63. The combination of claim 62, wherein the communications protocol includes a data packet which is transmitted over the interface bus for controlling and monitoring operations of the headset adapter base and the plurality of accessories coupled to the interface bus, the data packet comprising:
a synch pulse having a rate bit which defines a speed at which the data packet is transmitted;
a source address byte which represents a bus address where the data packet was transmitted from; and
a destination address byte which represents a bus address where the data packet is being transmitted.

64. The combination of claim 63, wherein the data packet further includes a checksum for detecting errors in transmission of the communications packet.

65. A device, comprising:
a telephone headset adapter base for coupling a telephone headset to a telephone system, and including a digital interface bus adapted for coupling at least one accessory to the digital interface bus in order to transmit data packets between the telephone headset adapter base and the accessory, thereby allowing the telephone headset adapter base to independently and directly control and monitor operations of the accessory, the telephone headset adapter base implementing a communications protocol defining a packet structure for the data packets transmitted between the telephone headset adapter base and the accessory, via the interface bus, the communications protocol including commands that enable the headset adapter base to independently control an operation of the accessory and monitor the status of the accessory.

66. The device of claim 65, wherein the at least one command is selected from the group of commands comprising of:
a command for simulating operations as if a button, switch or dial on the accessory has been activated;
a command for simulating operations as if a button, switch or dial on the headset adapter has been activated;
a command for resetting the accessory;
a command for determining the status of the accessory;
a command for reading from or writing to a memory structure within the accessory;

a command for determining the identity of the accessory; and a command for requesting a firmware version number from the accessory.

67. The device of claim 65, wherein the packet structure for the communications protocol comprises:

a synch pulse having a rate bit which defines a speed at which the data packet is transmitted;

a source address byte which represents a bus address where the data packet was transmitted from; and a destination address byte which represents a bus address where the data packet is being transmitted.

68. The device of claim 65, wherein the packet structure for the communications protocol comprises a checksum for detecting errors in transmission of the data packet.

69. A headset adapter base for testing a headset accessory coupled to the adapter base, the adapter base comprising:

a micro-controller, and an interface bus coupled to the micro-controller and adapted to be coupled to the headset accessory for transmitting and receiving communications packets back and forth between the micro-controller and the headset accessory, and when the headset accessory is in communication with the micro-controller, the communications packets enables the microcontroller to independently and directly test the headset accessory and verify proper operation of the headset accessory, the headset adapter base being configured to be coupled to a base telephone, wherein the headset accessory is monitored by transmitting a status monitoring message from the headset adapter base over the interface bus to the headset accessory.

70. The adapter base of claim 69, wherein the interface bus includes a bi-directional signaling line which is used for transmitting and receiving the communications packets between the headset accessory and micro-controller.

71. The adapter base of claim 69, wherein each communications packet includes a synch pulse which defines a transmission rate for the communications packet.

72. The adapter base of claim 71, wherein the synch pulse includes a rate bit having a bit period which defines the transmission rate for the communications packet.

73. The adapter base of claim 72, wherein the rate bit includes a rising edge and a falling edge within the bit period, and further wherein a duration of time between the rising edge and the falling edge is used to determine the bit period which is inversely related to the transmission rate of the communications packet.

74. A method for testing a headset accessory comprising:

coupling the headset accessory to a headset adapter base having an accessory interface bus and a micro-controller; and transmitting and receiving communications packets back and forth between the micro-controller and the headset accessory to independently and directly test the headset accessory and verify proper operation of the headset accessory by the headset adapter base, the headset adapter base being configured to be coupled to a base telephone, the headset accessory monitored by transmitting a status monitoring message from the headset adapter base over the accessory interface bus to the headset accessory.

75. The method of claim 74, wherein the interface bus includes at least one bi-directional signaling which is used for transmitting and receiving the communications packets between the headset accessory and micro-controller.

76. The method of claim 74, wherein each communications packet includes a synch pulse which defines a transmission rate for the communications packet.

77. The method of claim 76, wherein the synch pulse includes a rate bit having a bit period which defines the transmission rate for the communications packet.

78. The method of claim 77, wherein the rate bit includes a rising edge and a falling edge within the bit period, and further wherein a duration of time between the rising edge and the falling edge is used to determine the bit period which is inversely related to the transmission rate of the communications packet.

\* \* \* \* \*